United States Patent [19]
Mantovani et al.

[11] Patent Number: 4,745,624
[45] Date of Patent: May 17, 1988

[54] AUTOMATIC LINE BUILDOUT

[75] Inventors: John C. Mantovani, Lilburn; Larry D. Bishop, Norcross, both of Ga.

[73] Assignee: Conklin Instrument Corporation, Pleasant Valley, N.Y.

[21] Appl. No.: 802,966

[22] Filed: Nov. 29, 1985

[51] Int. Cl.[4] ............................................. H04L 25/34
[52] U.S. Cl. ...................................... 375/17; 379/400; 178/69 R
[58] Field of Search .......................... 375/3, 11, 12, 17; 328/164, 175; 333/17, 18, 28 R; 179/16 F, 17; 379/398, 399, 400; 178/69 R

[56] References Cited

U.S. PATENT DOCUMENTS

| | | | |
|---|---|---|---|
| 3,578,914 | 5/1971 | Simonelli | 333/18 |
| 3,906,174 | 9/1975 | Dotter, Jr. | 371/22 |
| 4,007,340 | 2/1977 | Russell | 179/170 R |
| 4,413,240 | 11/1983 | Dyke | 333/28 R |
| 4,592,068 | 5/1986 | Jessop et al. | 375/11 |

OTHER PUBLICATIONS

Bender et al., "Local Distribution System", *The Bell System Technical Journal*, vol. 54, No. 5, May–June 1975, pp. 919–942.
Dunbar et al., "Dataport–Channel Units for Digital Data System 56 kb/s Rate", The Bell System Technical Journal, vol. 61, No. 9, Nov. 1982, pp. 2741–2756.
PMI, "RPT-81/RPT-82 PCM Carrier Repeaters", 1981.
EXAR "XR-C277 Low Voltage PCM Repeater IC", Jun. 1981.

*Primary Examiner*—Robert L. Griffin
*Assistant Examiner*—Stephen Chin
*Attorney, Agent, or Firm*—Bernard, Rothwell & Brown

[57] ABSTRACT

A circuit for restoring and converting bipolar customer data signals into a pair of binary signals at a customer data frequency equal to or less than 250 KHz includes a PCM integrated circuit repeater for restoring and converting 1.544 MHz communication signals and transmission lines. Use of the high frequency repeater is enabled by a buffer amplifier connected in series with the input of a repeater amplifier and which has an input connected to a parallel resistance and capacitance network which is connected in series with an ALBO diode of the repeater for automatically inserting loss characteristics in the input signal so that the input signal has characteristics resembling losses of a signal passing through a maximum length transmission line. Fixed equalizer and amplification circuitry restores the original pulse signal magnitude and characteristics. Additionally, the circuit includes a slicing circuit responsive to a customer input clock recovery circuit wherein the phase of the recovered clock is controlled by gating a high frequency input clock signal through a doubling circuit for advancing the phase or through a pulse dropping circuit for retarding the phase.

7 Claims, 24 Drawing Sheets

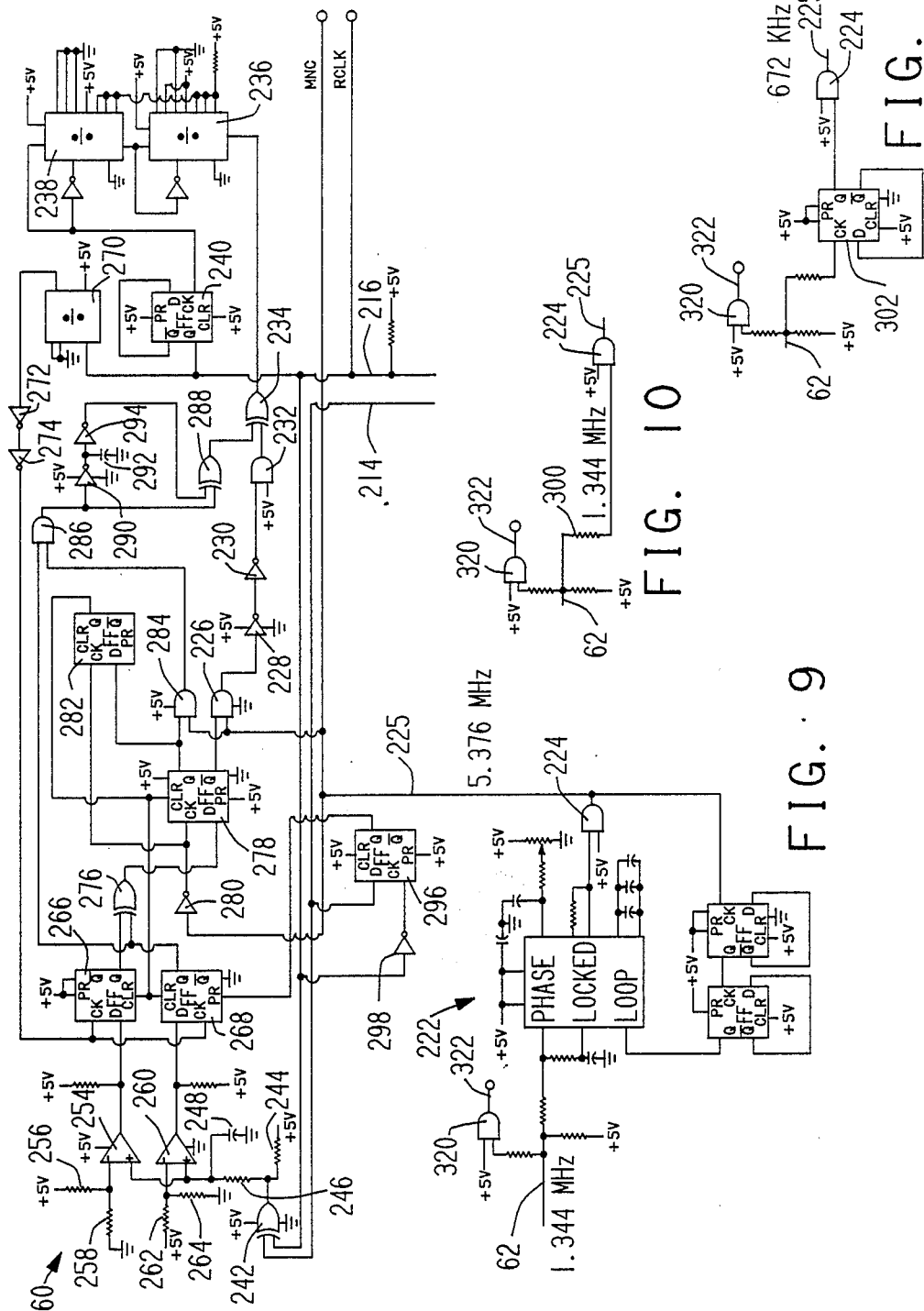

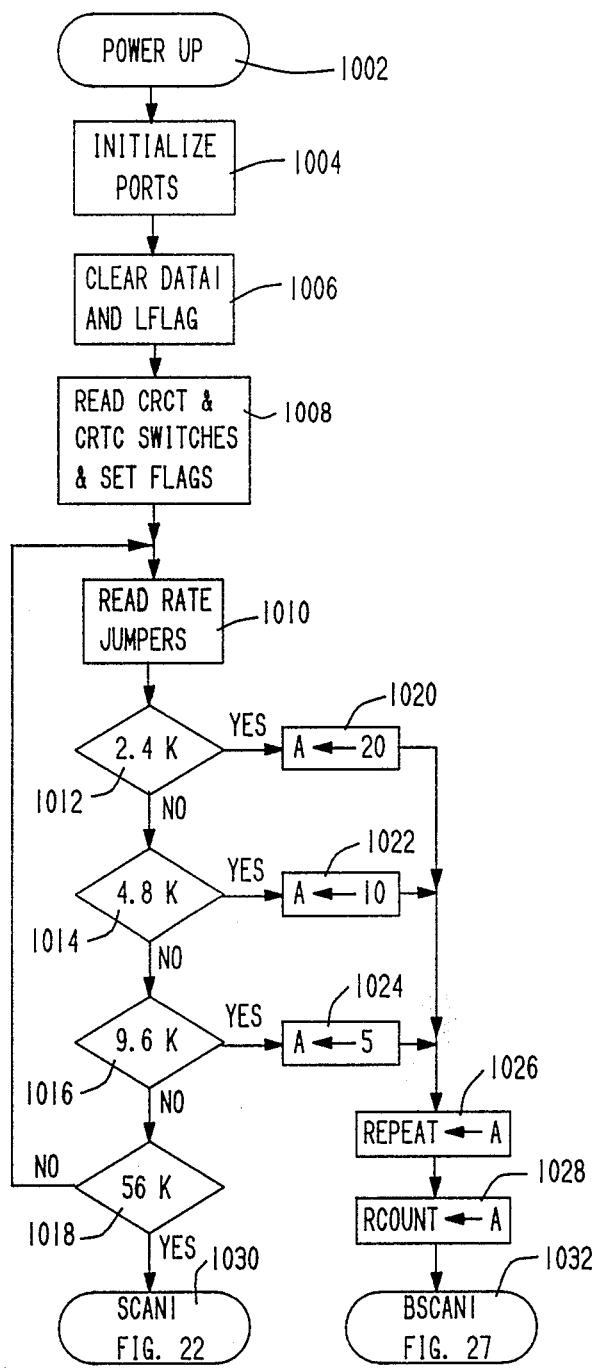
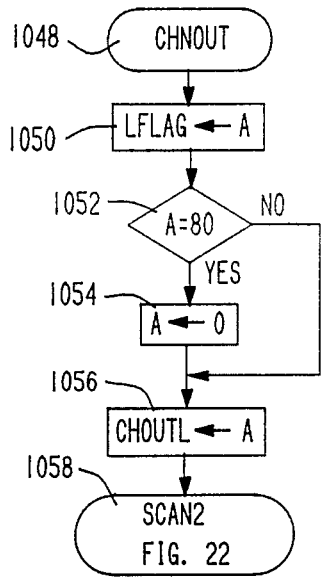
FIG. 21
FIG. 20

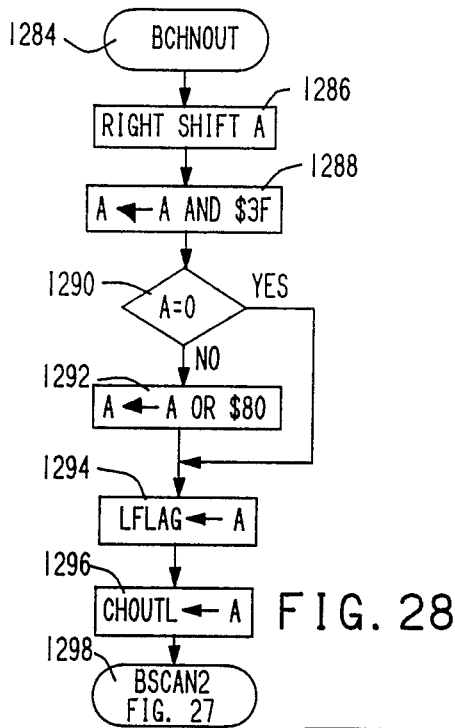
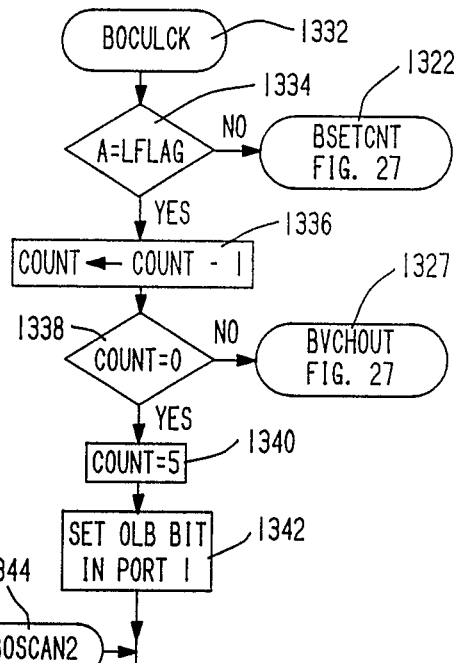
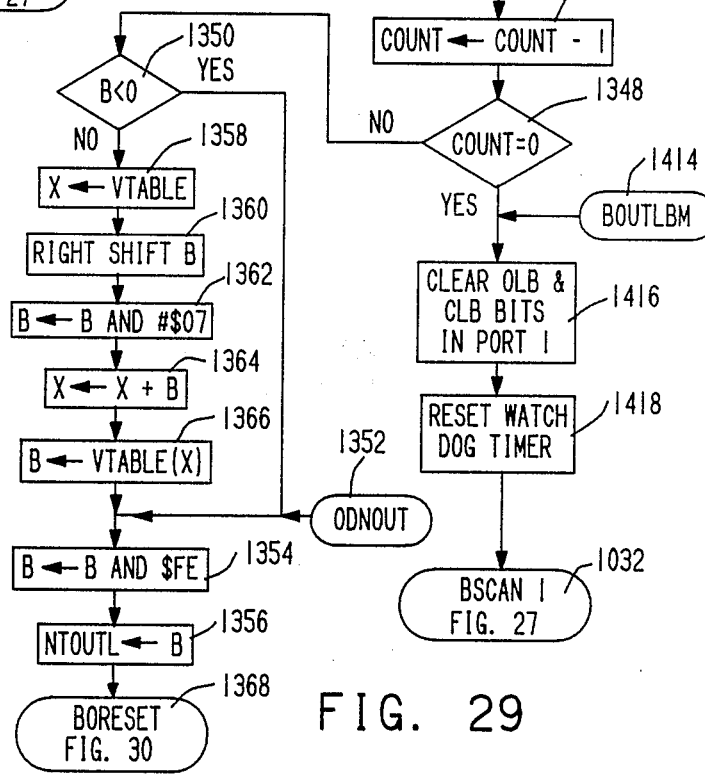
FIG. 28
FIG. 29

AUTOMATIC LINE BUILDOUT

TECHNICAL FIELD

The present invention relates to automatic line buildout circuits of low frequency receivers employed to terminate cable lines in synchronous digital data communication systems. Such receiver circuits are usually included in terminating units, such as office channel units, dataport units, digital data bank units, customer service units, data service units, ping-pong transmission units, and other terminating units for 4-wire or 2-wire customer lines carrying customer data signals at 250 kb/s (kilobits per second) or less.

DESCRIPTION OF THE PRIOR ART

Incoming digital data signals on customer lines must be initially reformed by the receiver to overcome line signal losses which vary in accordance with the length of the customer lines. Typical prior art digital receiver circuits provide low pass filters for initially filtering the incoming customer signal to remove high frequency components, and then pass the signal through a ALBO (automatic line build out) circuit which has a voltage controlled impedance to reduce the signal level to that corresponding to a maximum length customer line. The ALBO circuit generally includes a series resistance and a shunt network formed by a parallel connected capacitance and resistance in series with a FET varistor. The resistance of the varistor is controlled inversely from the magnitude of voltage produced by an output peak detector to introduce corresponding variable amounts of series resistance and parallel capacitance to approximate the characteristics of a maximum length customer line. The ALBO output is applied to an amplifier which includes a fixed frequency spectrum equalizing circuit designed to counteract the variation in loss for different frequencies in a customer signal passing through a maximum length line. The ALBO and equalizer circuitry has been constructed in the prior art by utilizing discrete components together with custom hybrid integrated circuits resulting in extensive design and assembly costs. Further, ALBO and equalizer circuits are unable to fully compensate for very short cable lengths, and thus under these circumstances, a fixed build out network is inserted into the input to provide sufficient signal attenuation to enable ALBO operation. Additionally, variations in prior art circuit components can result in an office channel unit which fails to properly recover the incoming bipolar customer signal.

SUMMARY OF THE INVENTION

The invention is summarized in a receiver circuit for restoring bipolar customer data signals at 250 KHz or less utilizing a PCM integrated circuit repeater designed for restoring 1.544 MHz communication signals in transmission lines. It is discovered that the amplifier, the peak detector, and the ALBO varistor of the repeater can be used in a restoring and converting circuit at 56 KHz or less provided that a buffer amplifier is inserted between the fixed equalizing repeater amplifier and the variable line buildout circuit formed by the varistor in series with a parallel capacitance and resistance network across the input.

An object of the invention is to construct an automatic line buildout circuit for use at 250 KHz or less and which offers substantial improvements by being less expensive and having less complexity.

One advantage of the invention is that a commercially available high frequency integrated circuit repeater replaces expensive prior art discrete circuits.

In a second aspect of the invention, a bipolar to binary converting circuit utilizes a parallel arrangement of a gate and a doubler circuit between a high frequency reference signal and a divider generating a recovered clock signal which operates a slicing circuit to restore and convert the bipolar signal into a pair of binary signals. The phase of the recovered clock signal relative to the bipolar signal is controlled by closing the gate for one reference pulse when the clock leads and by enabling the doubler circuit for one reference pulse when the clock trails.

One advantage of the converting circuit of the invention is that phase adjustments in clock recovery circuits by dropping or doubling a reference input pulse to a divider permit substantially easier conversion of the divider to generate clock signals at different frequencies compared to circuits where gate circuits change the divisor of the divider.

Other objects, advantages and features of the invention will be apparent from the following description of the preferred embodiment taken in conjunction with the accompanying drawings.

BRIEF DESCRIPTION OF THE DRAWINGS

FIG. 9 is a diagram of a clock pulse recovery circuit in the unit of FIG. 1, particularly for use at 56 kb/s.

FIG. 10 is a diagram of a clock reference source input circuit for use in the clock recovery circuit of FIG. 9 at 9.6 kb/s.

FIG. 11 is a diagram of a modified reference source input circuit for use in the clock recovery circuit of FIG. 9 at 4.8 kb/s.

FIG. 20 is a step diagram of an initialization program utilized in the computer of FIG. 16.

FIG. 21 is a step diagram of a routine called by the program of FIG. 22.

FIG. 28 is a step diagram of a program routine called by the program of FIG. 27.

FIG. 29 is a step diagram of a program routine for operating under an office channel unit loopback mode which is called by the program of FIG. 27.

DESCRIPTION OF THE PREFERRED EMBODIMENTS

Figure 1:
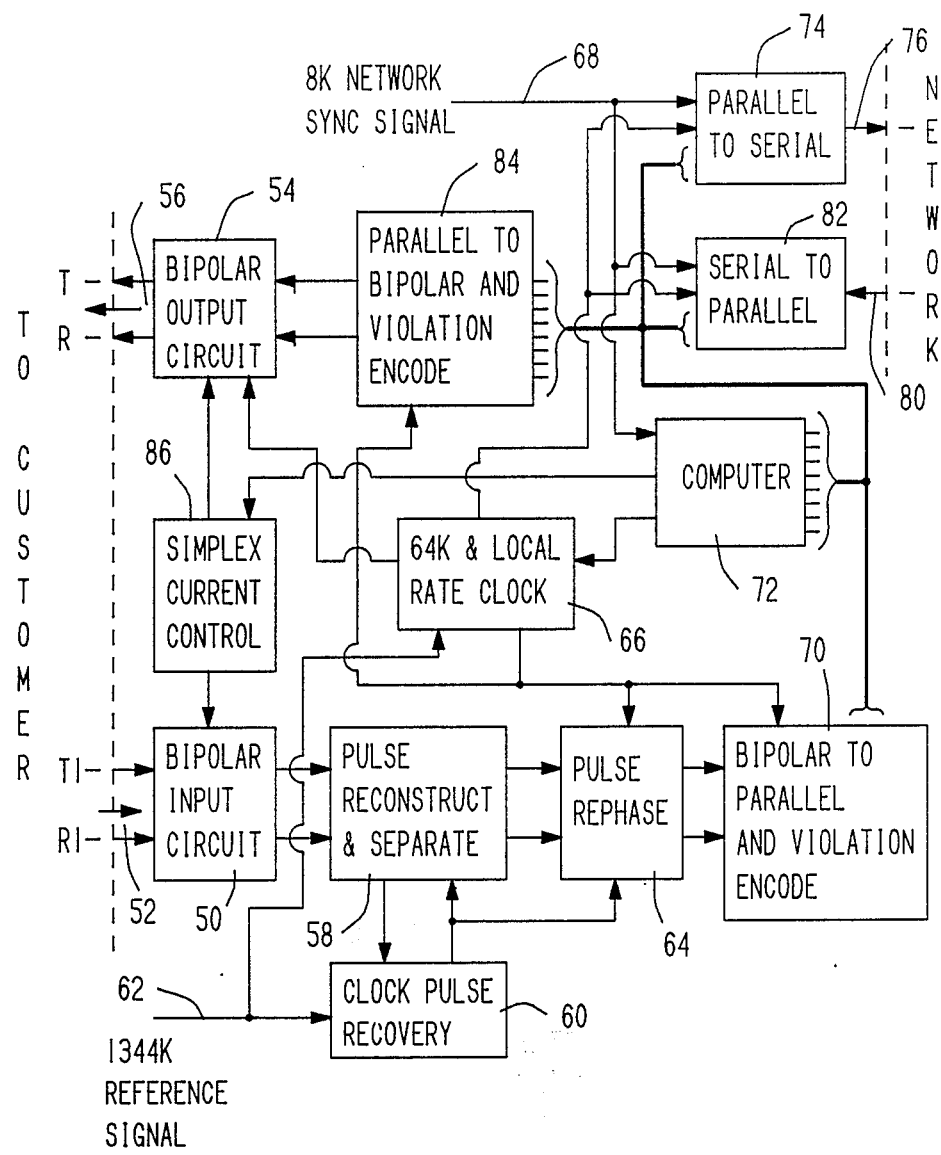
FIG. 1 is a block diagram of an office channel unit in accordance with the invention.

One embodiment of a receiver circuit with automatic line buildout in accordance with the invention is incorporated in an office channel unit illustrated in the drawings and described in detail hereafter. The receiver circuit with automatic line buildout can also be embodied in a variety of other units or circuits, including dataport units, digital data bank units, customer service units, data service units, ping-pong terminating circuits, and other terminating or repeating circuits or units for 4-wire or 2-wire bipolar data transmission lines carrying signals at 250 kb/s or less.

The office channel unit, illustrated in FIG. 1, is located at a local telephone or digital data carrier office for converting serial customer data signals into serial network data signals and for converting serial network data signals into serial customer data signals. The office channel unit has an input circuit 50 connected to the customer input lines 52 and has an output circuit 54 connected to the customer output lines 56 wherein the input and output lines 52 and 56 form the four wire transmission lines to the customer location. The data signals on the lines 52 and 56 are conventional bipolar signals of 56, 9.6, 4.8 or 2.4 kilobits per second. The incoming customer signals are passed to a pulse reconstruction and separation circuit 58 wherein the pulse signal is amplified and separated into separate binary signals containing the respective positive and negative pulses of the bipolar signal. A clock pulse recovery circuit 60 utilizes binary signals from the pulse reconstruct and separation circuit 58 to produce a clock pulse from a 1344 khz reference signal on line 62 from the local office sync and timing signal circuitry to aid in the accurate generation of the rail signals in circuit 58. A pulse rephasing circuit 64, also utilizing the recovered clock signal from circuit 60, delays each binary pulse from circuit 58 to coincide with a local rate clock signal from clock circuit 66 which is synchronized with the 8 khz sync signal on line 68 from the telephone network timing circuit. The rephased binary signals of the bipolar customer input are converted to parallel signals and decoded for XOV bipolar violation in circuit 70, the bipolar violation being expressed in the parallel signal by the eighth bit of the signal. A computer circuit 72 synchronized with the network sync signal on line 68 reads the parallel signal 70, at a rate corresponding to the customer byte transmission rate and passes the parallel signal to a parallel to serial circuit 74 which is operated by the network sync signal on line 68 and the 64 KHz clock signal from circuit 66 to generate outgoing binary signals on line 76 in the local area network format. The computer 72 also recognizes the eighth bit indication of a control code in the byte from circuit 70 and utilizes a memory table to convert the control code into the corresponding code required in the network signal prior to passing the byte to the circuit 74.

Serial binary signals from the network are received on line 80 by a serial to parallel converting circuit 82 which is then read by the computer 72 in synchronism with the 8 KHz network sync signal 68. Data bytes are transferred by the computer 72 to a parallel to bipolar conversion and violation encoding circuit 84 which generates a pair of binary signals corresponding to the desired outgoing positive and negative bipolar pulse signals for driving the bipolar output circuit 54 at the local rate clock from circuit 66. Control codes and a zero code received from the circuit 82 by the computer 72 are recognized and converted into codes which produce bipolar violations in circuit 84. Customer service unit and data service unit loopback codes are recognized by the computer 72 which operates simplex current control 86 which change the DC bias applied to lines 52 and 56 to operate a loopback circuit in a conventional customer service unit (not shown) or conventional data service unit (not shown) at the customer premises.

Figure 3:
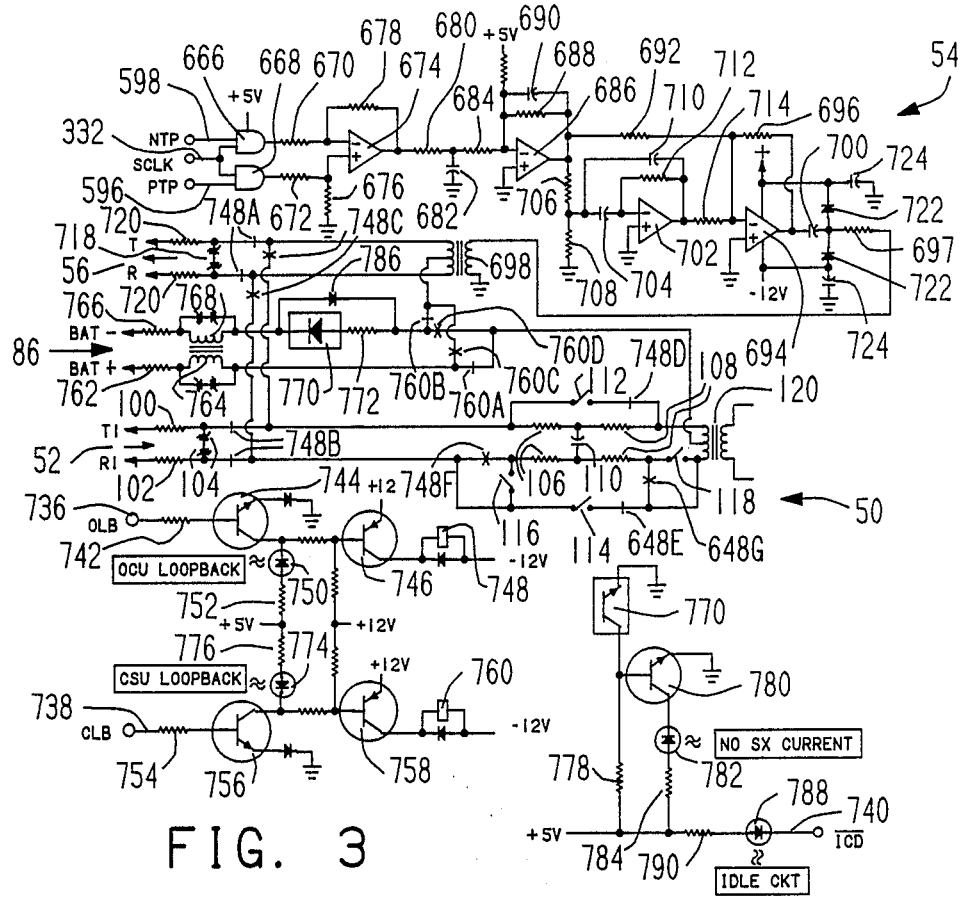
FIG. 3 is a circuit diagram of customer input and output circuits and a simplex current control circuit in the unit of FIG. 1.

In the input circuit 50, as illustrated in FIG. 3, lightning protection for the receiver circuit is provided by current limiting resistances 100 and 102 in series with the lines 52 and by break-down diodes 104 connected across the input lines. A lightning surge that threatens a line receiver is first reduced to 600 volts by the breakdown of a carbon block (not shown), and is further reduced to 18 volts by break-down of the diodes 104. The circuit 50 also includes a fixed line build out pad formed by resistance pairs 106 and 108 in series with each of the input lines and a capacitance 110 coupled across the lines for approximating the loss characteristics of a medium length line; the automatic line build out circuit (ALBO) provided in the receiver does not have sufficient dynamic range for building out the entire range of cable lengths that can be encountered in providing digital service to a customer. Consequently, the fixed line buildout pad can be inserted into the input circuit by opening screw switches 112 and 114 and closing screw switches 116 and 118 to provide signal attenuation approximating the loss characteristics of a medium length line.

Figure 5:
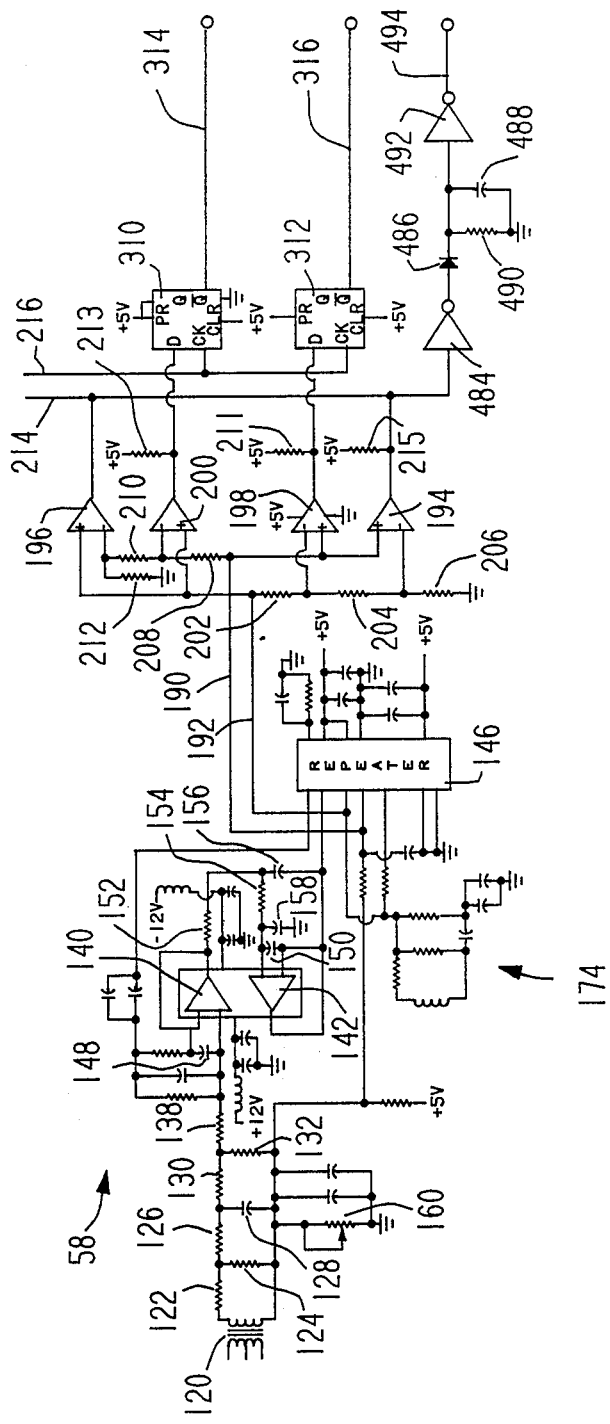
FIG. 5 is a circuit diagram of pulse reconstructing and separating circuit of the unit of FIG. 1.
Figure 6:
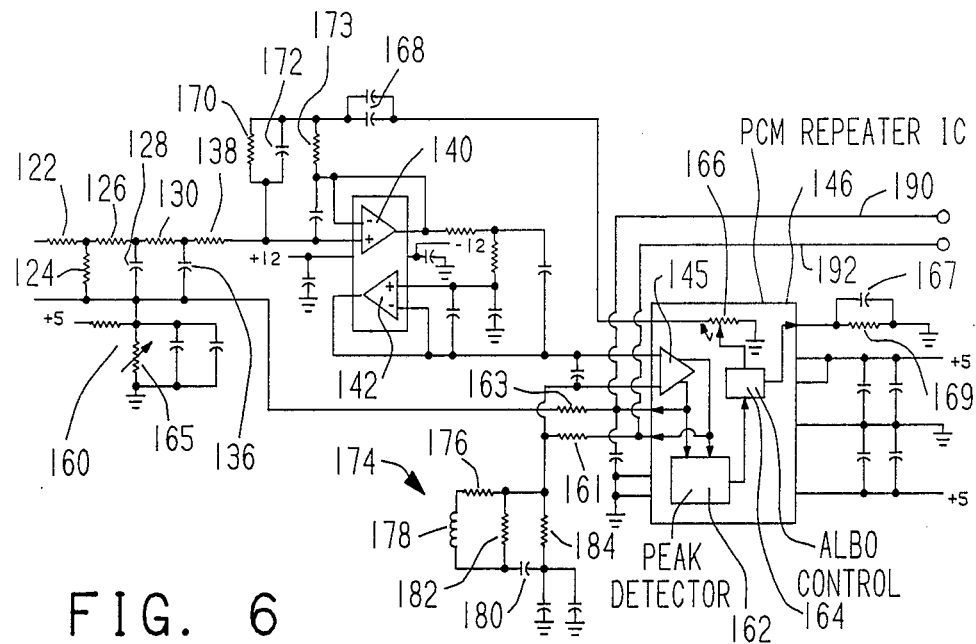
FIG. 6 is a diagram showing functional units in automatic line buildout and equalizing portions of the circuit of FIG. 5.

A transformer 120 couples the input circuit to the pulse reconstruct and separation circuit 58 illustrated in FIG. 5. The transformer 120 isolates the line receiver from DC potentials and spurious common mode signals which can be coupled onto the input transmission lines 52. The input transformer is a 1:2 step up transformer with an approximate frequency response from 100 hz through 100 khz. Series resistance 122 and shunt resistance 124 on the secondary side of the transformer 120 provide the characteristic load impedance generally required in transmission line specifications; the shunt impedance of the line receivers in the circuitry 58 is so large that it has substantially no affect on the transmission line terminating resistance. A resistance 126 and capacitance 128 provide low pass filtering to eliminate high frequency components from the input signals. For a customer rate of 56 kb/s, additional flat attenuation of the input signal is provided by a divider formed from resistances 130 and 132. For subrate customer transmission of 9.6, 4.8 and 2.4 kb/s this attenuation is not needed, but, as shown in FIG. 6 for subrates of 4.6 and 2.4 kb/s additional low pass filtering is provided by replacing resistance 132 with capacitance 136 to eliminate higher frequency components in the input signal which could interfere with these lower subrate signals.

An isolation resistance 138 connects the output of the low pass filter to the input of one of a pair of buffer amplifiers 140 and 142 connected in series to the input of a preamplifier 145 in a PCM repeater 146. Capacitances 148 and 150 coupled across the inputs of the amplifiers 140 and 142 together with resistances 152 and 154 and shunt capacitances 156 and 158 between the amplifiers 140 and 142 provide additional low pass filtering and shaping to roll-off high frequency noise from the transmission line to thus provide increased signal-to-noise ratio for the receiver circuit.

A biasing circuit 160 provides bias for the preamplifier 145 of the repeater 146. Feedback resistance 161 is used to return the inverting output to the non-inverting input of amplifier 145 while the non-inverting input is connected by the resistance 163 to the fixed bias circuit 160. The fixed biasing potential is adjusted by the potentiometer 165 until the differential output offset, measured between the non-inverting and inverting outputs of the amplifier 145, is zero. The fixed DC bias is applied to the secondary of the input transformer 120 and is coupled through the input filter, buffer amplifiers 140 and 142, and shaping filter to the inverting input of the amplifier 145.

The PCM repeater 146 is an integrated circuit unit designed for utilization in pulse code modulation transmission lines operating at relatively high frequencies of 1.544 megahertz. These commercially available integrated circuit repeaters include, besides the amplifier 145, a peak detecting circuit 162 which produces a output voltage applied to an ALBO control circuit 164 operating an ALBO diode or varistor such as a field effect transistor 166 which is normally connected in series with a parallel arrangement of a fixed resistance and capacitance across the inputs of the amplifier 145 for providing a variable shunt impedance to provide automatic line build-out functions for the circuit. An ALBO filter consisting of capacitance 167 and resistance 169 provides for filtering of the peak output to produce a DC control voltage for the ALBO diode 166 proportional to the magnitude by which the positive and negative pulse output of the peak detector 162 exceeds the detector threshold, for example 1.6 volts. The commercially-available repeater includes additional circuitry, which is not illustrated, such as oscillator circuitry for generating a recovered clock pulse and slicing circuitry with flip-flops operated by the recovered clock for generating a pair of binary signal outputs corresponding to the positive and negative pulses of the input signal.

The PCM repeaters for 1.544 Mb/s transmission lines are designed for operation within a narrow range about this rate, and generally cannot be made to operate satisfactorily at low transmission rates of 250 kb/s or less by making corresponding changes in values of external components associated with the repeaters. Surprisingly, it has been found that by providing the buffer amplifier input facilities to the repeater 146, the preamplifier 145, peak detector 164 and ALBO portions 164 and 166 of the repeater 146 can be utilized at data rates of 250 kb/s down to 2.4 kb/s to thus avoid having to assemble and construct circuits employing discrete circuit components or special custom designed integrated circuits to perform such functions. The employment of buffer amplifiers between the ALBO circuitry and the equalization amplifier 145 enables the employment of the high frequency amplifier 145 which in the absence of the buffering amplifiers would generally be unstable at the low rates employed in customer data signals.

The ALBO diode 166 of the repeater 146 is connected by coupling capacitances 168 in series with an impedance network formed by parallel resistance 170 and capacitance 172 designed to provide variable loss characteristics to the buffer amplifier input so that the total loss characteristics of the actual transmission line and input circuitry is generally equal to the loss characteristics of a transmission line having maximum length. Thus, the circuit can adapt for large variations in transmission loss characteristics due to varying length lines without having to be recalibrated or adjusted for each individual transmission line.

A feedback resistance 173 is connected from the output of the buffer amplifyier 140 through the network of resistance 170 and capacitance 172 to the non-inverting input of the amplifier 140. This feedback resistance 173 does not change the general characteristic of the ALBO network, but it does provide an additional degree of freedom in the realization of the circuit constants that allows better tracking of the transmission line characteristic by the ALBO.

Figure 8:
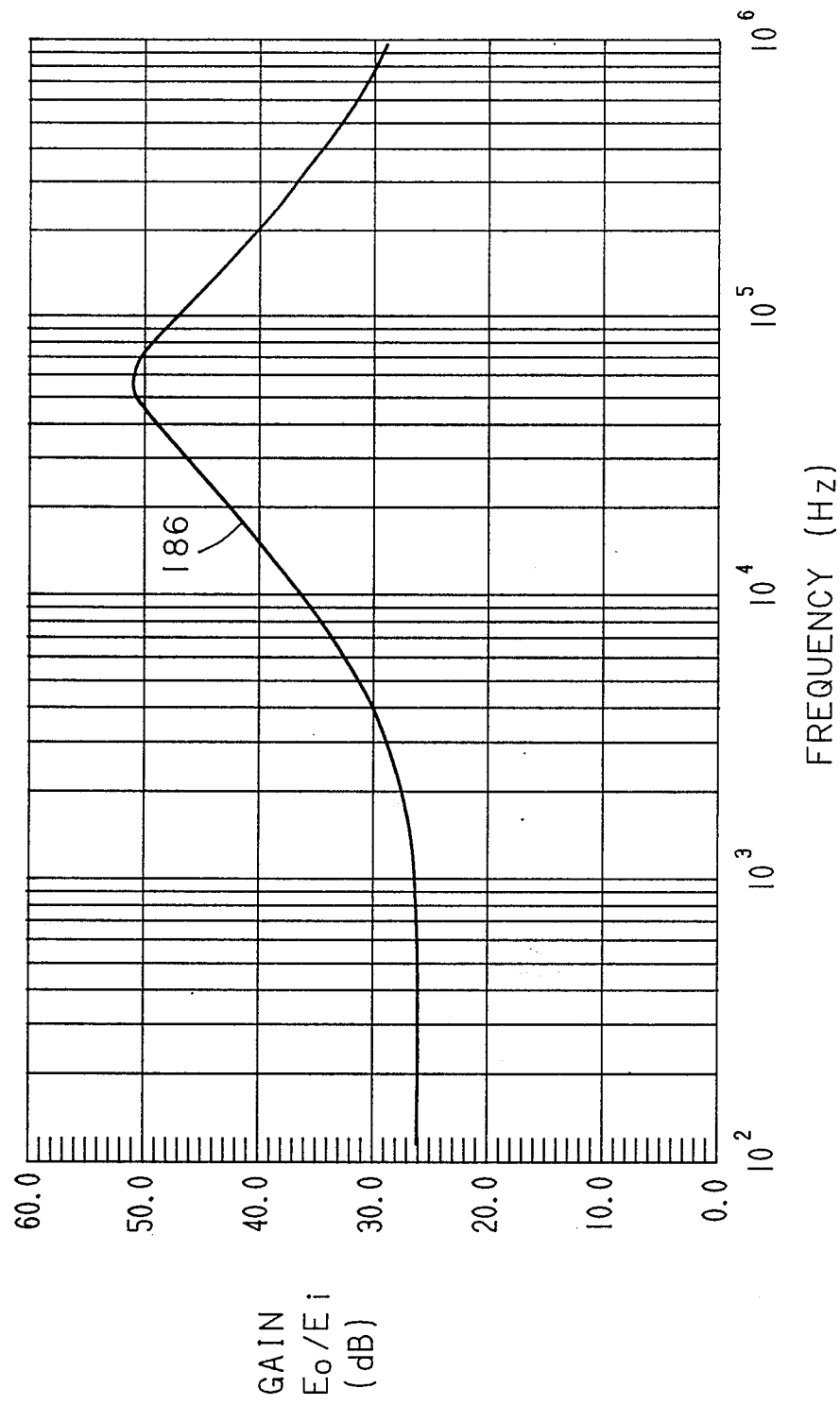
FIG. 8 is a graph of the frequency spectrum of gain for the equalizing portion of the circuit of FIGS. 5–7.

The output of the amplifier 145 is coupled across an equalizing circuit indicated generally at 174 which includes series resistance 176, inductance 178 and capacitance 180, together with shunt resistances 182 and 184, all of which have values selected to produce a desired frequency dependent gain characteristic for the amplifier 145, for example, as shown by the graph in FIG. 8 for the customer rate of 56 kb/s.

Figure 7:
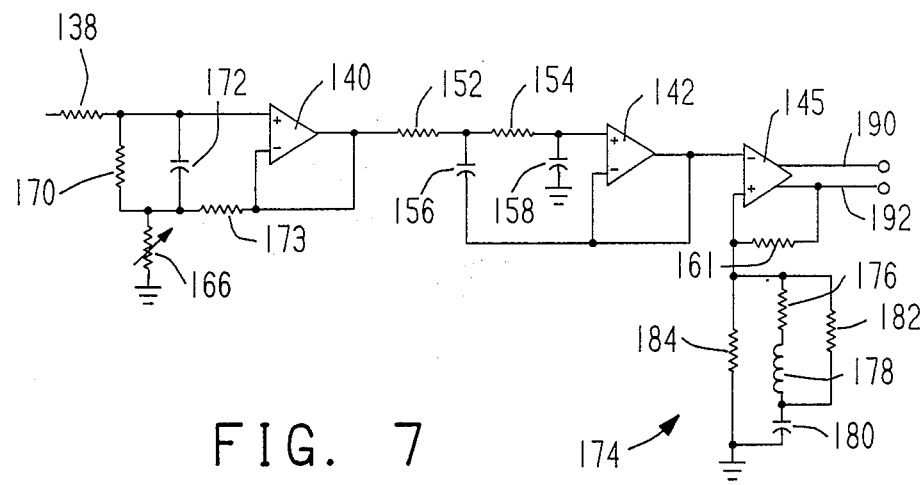
FIG. 7 is a simplified functional diagram of the automatic line buildout and equalizing circuitry of FIGS. 5 and 6.

The operation of the automatic line buildout and equalizing circuit can be understood by referring to FIG. 7 wherein the circuitry is illustrated in functional form with various biasing, coupling and other components having no substantial affect upon the signal have been eliminated. FIG. 8 shows a typical transfer or gain function 186 of the equalizer circuitry for a maximum length line of 56 KHz. The incoming signal passes through the buffer amplifiers 140 and 142 to the amplifier 145 which is coupled to the equalizer circuit 174 to restore frequency equalization of the incoming signal as required for a maximum length transmission line. When the actual transmission line is a maximum length, the peak output of the amplifier 145 will be about 1.6 volts which produces a 0 output voltage from the peak detector 162 to maintain the varistor 166 in a high resistance mode so that series resistance presented by resistance 138, as well as the preceding resistances introduces substantially no signal loss due to the high input impedance of the amplifier 140. The high resistance of the varistor 166 results in substantially no shunt impedance being applied to the input signal by the resistance 170 and capacitance 172. When the transmission line is less than a maximum length, the output of the amplifier 145 will be greater than 1.6 volts which results in the peak detector circuit 162 generating an output voltage to reduce the resistance value of the varistor 166. The lesser resistance value of the varistor 166 reduces the shunt impedance on that input of amplifier 140 producing increased loss through resistance 138. This increased loss is partly flat, i.e., frequency independent, corresponding to transmission line resistance losses, and partly frequency dependent corresponding to transmission line shunt capacitance losses. The value of the circuit components are selected as the losses inserted for transmission lines less than maximum length produce signal attenuation closely approximating that produced by a maximum length transmission line.

Considering the ALBO network as a series impedance and a shunt impedance the transfer function of this network consists of an adjustable zero, adjustable flat loss, and a fixed pole. The adjustable zero is used to cancel the effective pole of the less than maximum length cable pair. The flat loss of the ALBO and its fixed pole then combine with the flat loss of the less than maximum length cable pair such that the combination approximates the loss characteristics of a maximum length loop. The flat loss and zero location are functions of the variable resistor 166 which is physically realized with the varistor diode internal to repeater 146. Resistor 166 is inversely controlled by the peak detector circuitry at the output of the equalizer 145. The peak of the equalized signal closely tracks the cable loss at one-half the data rate since the bipolar cable signal has its largest frequency component at one-half the data rate. Thus, as the associated cable pair becomes longer, the peak signal becomes less, resistor 166 increases, ALBO loss decreases and the zero frequency location tends toward the fixed pole frequency. Therefore, on a maximum-length cable pair, the ALBO is essentially transparent, adding neither gain nor loss at any frequency.

Figure 12:
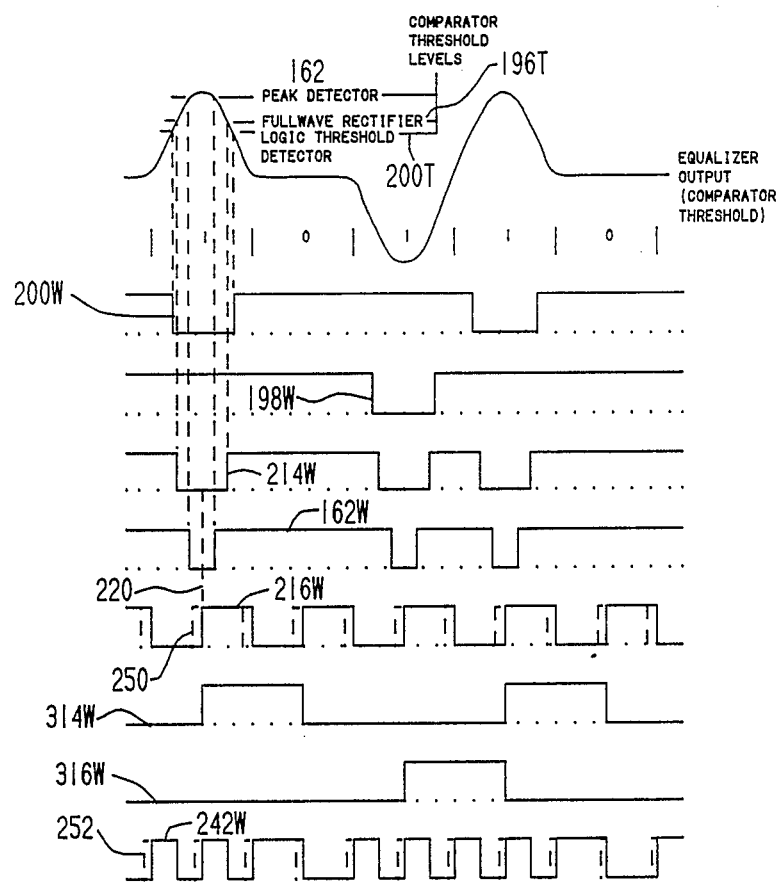
FIG. 12 is a graph of pulse wave forms generated in the bipolar slicing and clock recovery circuits of FIGS. 5 and 9.

The non-inverting and inverting outputs of the amplifier 145 on respective lines 190 and 192, FIG. 5, are connected to the non-inverting inputs of respective comparators 194 and 196 forming a full wave rectifier, and are connected to non-inverting inputs of respective comparators 198 and 200 which form respective positive and negative logic threshold detectors. Reference inputs for the comparators 194 and 198 are provided by a voltage divider formed by resistances 202, 204 and 206 connected between the inverting output 192 and ground, while reference voltages for the inverting inputs of the comparators 196 and 200 are provided by the voltage divider formed by resistances 208, 210 and 212 connected serially between the output line 190 and ground. The positive and negative thresholds of the respective comparators 194 and 196, as determined by the junction between resistances 204 and 206 and the junction between resistances 210 and 212, are selected to be about 70% of the peak voltage level, as shown in FIG. 12 for the threshold 196T of the positive pulse. The respective positive and negative thresholds of the comparators 198 and 200, as determined by the junction between resistances 202 and 204 and the junction between resistances 208 and 210, are selected to be about 50% of the peak voltage level, as shown for threshold 200T. The output waveforms 198W and 200W from comparators 198 and 200, biased positive through resistances 211 and 213, are binary pulse signals corresponding to the respective positive and negative pulses in the incoming bipolar signal. The output waveform 214W from the full wave rectifier, and waveform 162W from the peak detector 162 are also shown in FIG. 12.

The output 214 of the full wave rectifier comparators 194 and 196, biased positive through resistance 215, is utilized to produce a recovered customer clock pulse on line 216. As shown in FIG. 9, a system reference source on line 218 at a frequency 1.344 MHz is multiplied or divided to obtain the corresponding local customer rates with the phase of the regenerated clock 216 being controlled so that the positive edge of the regenerated clock 216W occurs in the center of each customer pulse in signal 214W as shown by the dashed line 220 in FIG. 12. For the 56 kb/s OCU as shown in FIG. 9, the 1.344 MHz network reference is multiplied by a phase lock loop circuit 222 to produce a 5.376 MHz signal from the output of buffer gate 224 which is passed through normally open AND gate 226, inverter amplifiers 228 and 230, buffer gate 232, exclusive OR gate 234 to the input of a divider consisting of counters 236 and 238 and a flip-flop 240 which divide the 5.376 MHz signal by 96 to obtain the 56 kb/s recovered clock signal 216. The recovered clock signal 216 and the full wave rectified pulse output 214 are applied to respective inputs of an exclusive OR gate 242 which has its output biased positive by a resistance 244 and connected to an integrater consisting of resistance 246 and capacitance 248. When the positive edges of the recovered clock signal 216W correspond to the center 220 of the incoming pulses, as shown in FIG. 12, the output 242W of the exclusive OR gate 242 has a duty cycle of 50% to thus produce a voltage across the capacitance 242 equal to one half of the bias voltage. When the positive edges of the pulses 216W lead the center 220, as shown by the dashed line 250 in FIG. 12, then the duty cycle of the output of the exclusive OR gate 242 increases as shown by the dashed line 252 to thus increase the voltage across the capacitance 248; if the positive edge of pulses 216 trail the center 220, the duty cycle of gate 242 decreases to produce a corresponding lower voltage across the capacitance 248.

The voltage across the capacitance 248 is connected to a non-inverting input of a comparator 254 which has its inverting input connected to a voltage divider formed from resistances 256 and 258 across the supply voltage, and to an inverting input of a comparator 260 which has its non-inverting input connected to a voltage divider formed by resistances 262 and 264 across the voltage source. The resistances 256 and 258 are selected to provide a reference source so that the comparator 254 produces a positive output when the recovered clock pulses 216 lead the center of the detected incoming pulses by more than about 8°, while the values of the resistances 262 and 264 are selected so that the comparator 260 produces a positive output only when the leading edge of the pulses 216 trail the centers of the incoming pulses by more than about 8°. The outputs of the comparators 254, 260 are connected to data inputs of respective flip-flops 266 and 268 which receive a clock signal from a counter 270 through inverters 272 and 274. The counter 270 divides the clock signal 216 by 64 so that a normal phase adjustment in the recovered clock pulses can only occur once during every 64 pulses on line 216; this prevents clock instability or hunting. The non-inverted outputs of the flip-flops 266 and 268 are applied to respective inputs of an exclusive OR gate 276 which has its output connected to the data input of a flip-flop 278 which is clocked through inverter 280 from the high frequency reference clock signal from buffer gate 244. A flip-flop 282 has its data input connected to the non-inverted output of the flip-flop 278 so that upon the ensuing reference pulse from inverter 280, the flip-flops 266, 268 and 278 are reset by the non-inverted output of the flip-flop 282. The inverted output of the flip-flop 278 is connected to one input of the AND gate 226 so that for one cycle of the reference pulse from buffer gate 224, the gate 226 is disabled and the count in the counters 236 and 238 is delayed by one reference pulse to thus retard the recovered clock pulses 216 when the positive edge of the pulses 216W lead the center 220 of the incoming pulses 214W.

Figure 13:
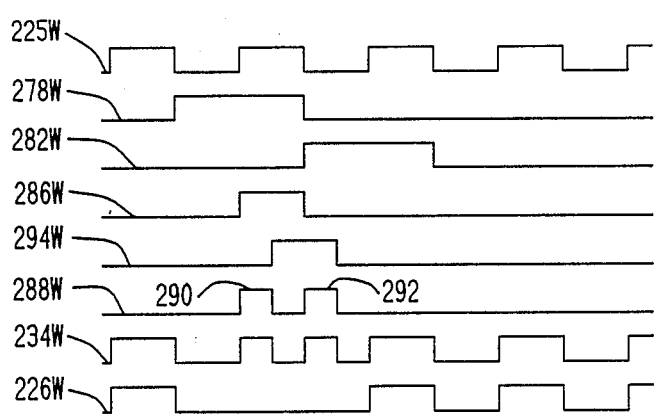
FIG. 13 is a graph of various high frequency pulse wave forms of the clock reference source and clock recovery circuit of FIG. 9.

The non-inverted output of the flip-flop 278 is connected to one input of an AND gate 284 which has its input connected to the output of the reference clock buffer gate 224 to pass one cycle of the reference clock signal 225W, FIG. 13, to one input of an AND gate 286 which has its other input controlled by the non-inverted output of flip-flop 268 so that when the positive edge of the pulses 216W trail the center of the incoming pulses, one reference clock pulse 225W is passed through gate 286. The waveforms 278W and 286W from the flip-flop 278, flip-flop 282 (which resets flip-flop 278), and gate 286 are shown in FIG. 13. The output of AND gate 286 is connected to one input of exclusive OR gate 288 and to an inverter 290 which has its output coupled across a capacitance 292 and to the input of an inverter 294 having its output connected to the other input of the exclusive OR gate 288. The capacitance 292 delays the inverter 294 as shown by the wave form 294W in FIG. 13 to result in the exclusive OR gate 288 producing two pulses 290 and 292 as a result of the reference clock pulse passed by the AND gate 286. These two pulses 290 and 292 are applied to the second input of exclusive OR gate 234 which combines the waveform 288W with the waveform 226W to produce waveform 234W wherein the two pulses 290 and 292 replace the reference clock pulse blocked by gate 226 to thus advance the counter 236 two steps and to advance the phase of the recovered clock pulse signal 216W relative to the incoming pulses 214W.

The clock recovery circuit of FIG. 9, also includes a clock phase restoring circuit having a flip-flop 296 with its data input connected to the full rectified incoming pulse line 214 and its clock input from the recovered clock line 216 through inverter 298. The flip-flop 296 is operated when the negative or trailing edge of the recovered clock pulses 216W occur during the negative recitified pulses 214W. The non-inverting output of flip-flop 296 is applied to the preset input of flip-flop 268 to hold the flip-flop 268 operated while the counter 236 is rapidly advanced by double pulses generated through exclusive OR gate 288 until the negative edges of the pulses 216W no longer occur during the negative pulses 214W. This prevents the clock recovery pulses 216W from being falsely synchronized 180° out of phase or with the positive portion of the rectified signal 214W.

Figure 2:
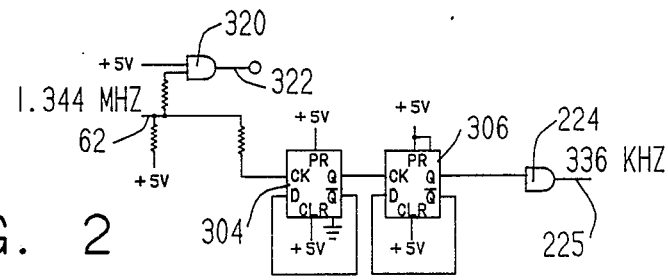
FIG. 2 is a diagram of a clock reference source input circuit for use in a clock recovery circuit (FIG. 9) in the office channel unit of FIG. 1 at a customer rate of 2.4 kb/s.

Modifications replacing the phase locked loop 222 for providing subrate office channel units are illustrated in FIGS. 10, 11 and 2. For these subrate office channel units, the preset inputs of 236 and 238 are modified to divide by 70 so that the total division with flip-flop 240 is equal to 140. Manufacture of the office channel units for different rates is simplified by avoiding gate circuits controlling the division in making phase adjustments to the recovered clock. For the 9.6 kb/s modification of FIG. 10, the incoming 1.344 MHz reference clock on line 62 is fed by resistance 300 directly to the buffer gate 224. In the 4.8 kb/s modification of FIG. 11, the reference signal on line 62 is divided by 2 by flip-flop 302 before passing to buffer gate 224. In the 2.4 kb/s modification of FIG. 2, the reference clock on input 218 is divided by 4 by flip-flops 304 and 306.

Referring back to FIG. 5, the positive edges of the recovered clock signal on line 216 clocks flip-flops 310 and 312 which have their respective data inputs connected to the outputs of comparators 198 and 200 so that positive going pulses appearing in the bipolar input signal appear on the inverting output 314 (see waveform 314W. FIG. 12) of the flip-flop 310 and the negative pulses in the incoming bipolar signal appear on the inverting output 316 (see waveform 316W, FIG. 12) of the flip-flop 312.

Figure 14:
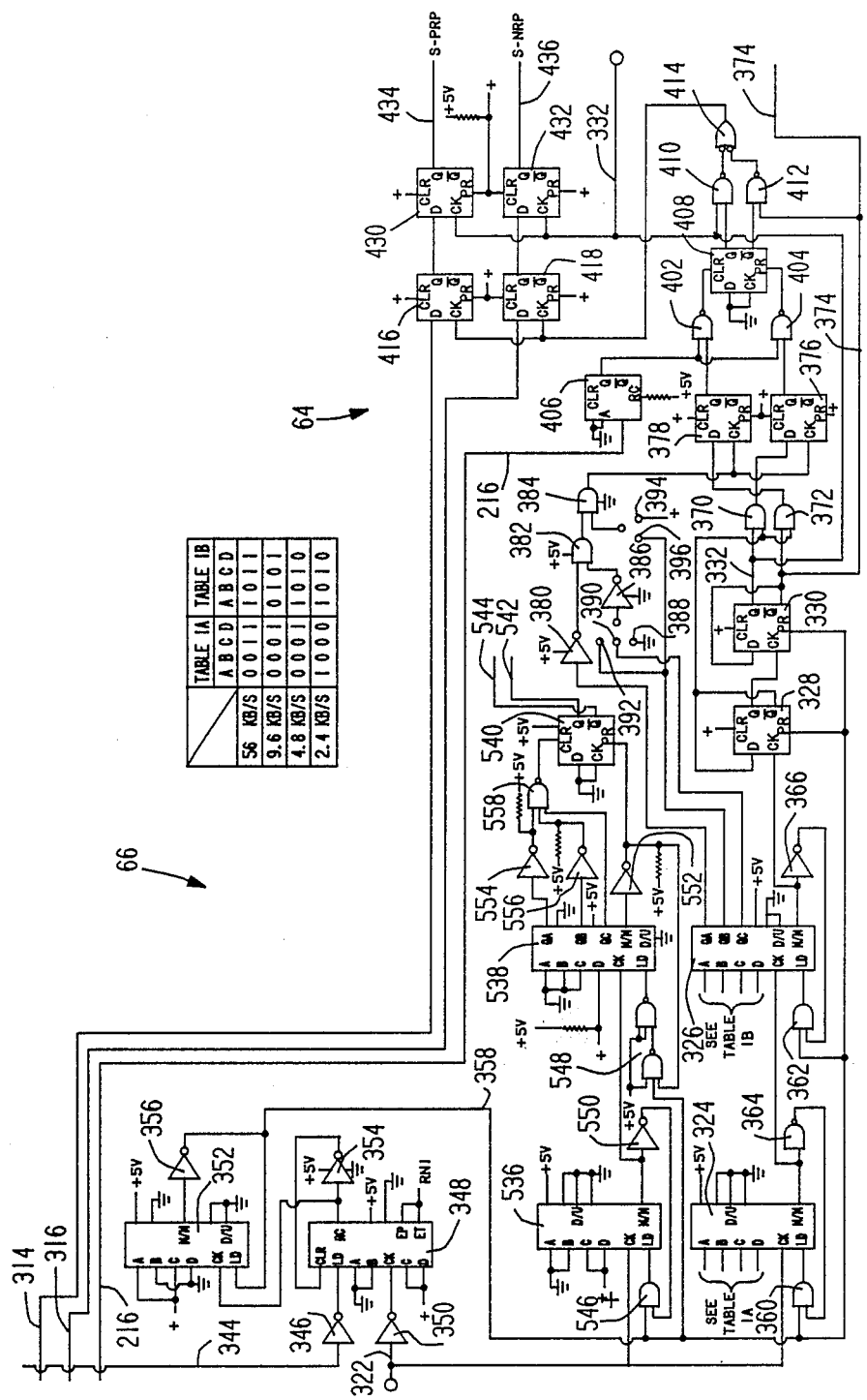
FIG. 14 is a diagram of circuits for generating synchronized network and local pulse rate clocks and for rephasing customer serial input pulses in the unit of FIG. 1.
Figure 15:
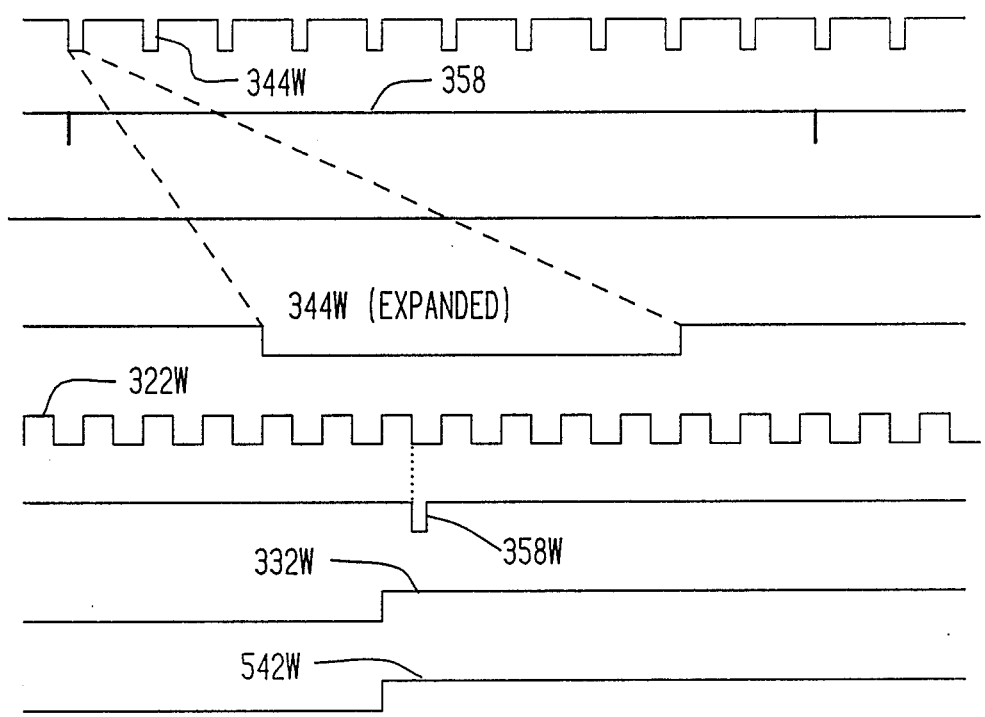
FIG. 15 is a graph of synchronizing pulse wave forms used in the network clock and customer rate clock generators of FIG. 14 for synchronization with the network sync pulse.
Figure 17:
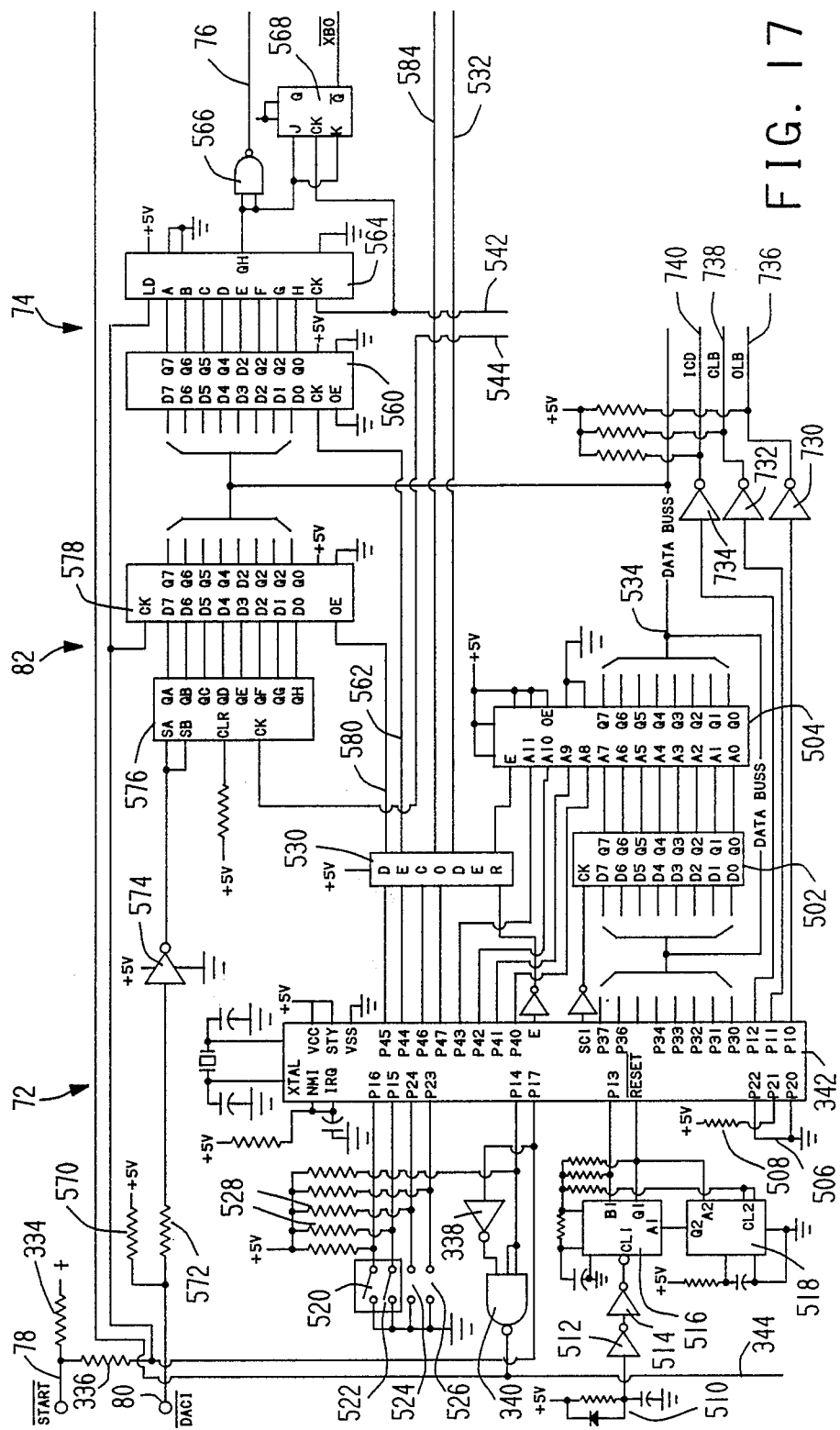
FIG. 17 is a diagram of computer circuitry and network input and output circuitry in the unit of FIG. 1.

The phase of the incoming bipolar customer signal varies with varying customer line lengths, and thus the separated positive and negative pulses on lines 314 and 316 are rephased by the pulse rephase circuitry 64 in FIG. 14 with a synchronized clock from clock circuitry 66. The 1.344 MHz network system clock on line 62 is applied by buffer amplifier 320, FIG. 9, to line 322 which, as shown in FIG. 14, is applied to a counting arrangement consisting of serially connected counter 324, counter 326, and flip-flops 328 and 330 to generate a customer rate clock signal which has every seventh pulse (56 kb/s) or every sixth pulse (2.4, 4.8 and 9.6 kb/s) synchronized with the 8K sync signal of the telephone network system. As shown in FIG. 17, the 8K sync line 78, biased positive by resistance 344 is connected by resistance 336 to one input of an inverter 338 which has its output connected to NAND gate 340 controlled by an output of a microprocessor 342 in the computer 72. At 56 kb/s the gate 340 is maintained enabled to pass every sync pulse to line 344; at 9.6 kb/s the NAND gate 340 is enabled to pass every fifth sync pulse; at 4.8 kb/s the NAND gate 340 is enabled to pass every tenth sync pulse; and at 2.4 kb/s the NAND gate 340 is enabled to pass every 20th sync pulse. As shown in FIG. 14 the sync pulse line 344 is connected by an inverter 346 to the load input of a counter 348 to enable the counter during the sync pulse and to preset the counter to the count of 12 at the trailing edge of the sync pulse. The 1.344 mhz clock on line 322 is inverted by inverter 350 and applied to the clock input of counter 348. The full count indicating output of the counter 348 is connected to the clock input of a counter 352 to advance the count in counter 352 one count after 2½ cycles of the 1.344 clock on line 322 during the sync pulse on line 344. Additionally, the full count output of counter 348 is applied by inverter 354 to the clear input of counter 348 to clear the count. The count in counter 352 is initially set at 5 so that upon receipt of 10 sync pulses on line 344, the max output of counter 352 operates inverter 356 to apply a clear signal on line 358 to AND gate 360 connected to the load input of counter 324, to AND gate 362 connected to the load gate of counter 326 and to preset inputs of flip-flops 328 and 330 to synchronize the voltage divider formed by counters 324, 326 and flip-flops 328 and 330. The preset inputs of the counters 324 and 326 are selected in accordance with Table 1A and 1B for the corresponding 56, 9.6, 4.8 and 2.4 kb/s operation. Under normal operations the max outputs of counters 324 are applied by respective inverters 364 and 366 to second inputs of AND gates 360 and 362 to provide continuous operation. FIG. 15 shows the relative timing of the 8K sync pulses 344W on line 344, high frequency reference clock signal 322W on the line 322, and clear pulse 358W on line 358 as well as the beginning of the customer clock pulse 332W on line 332.

Figure 16:
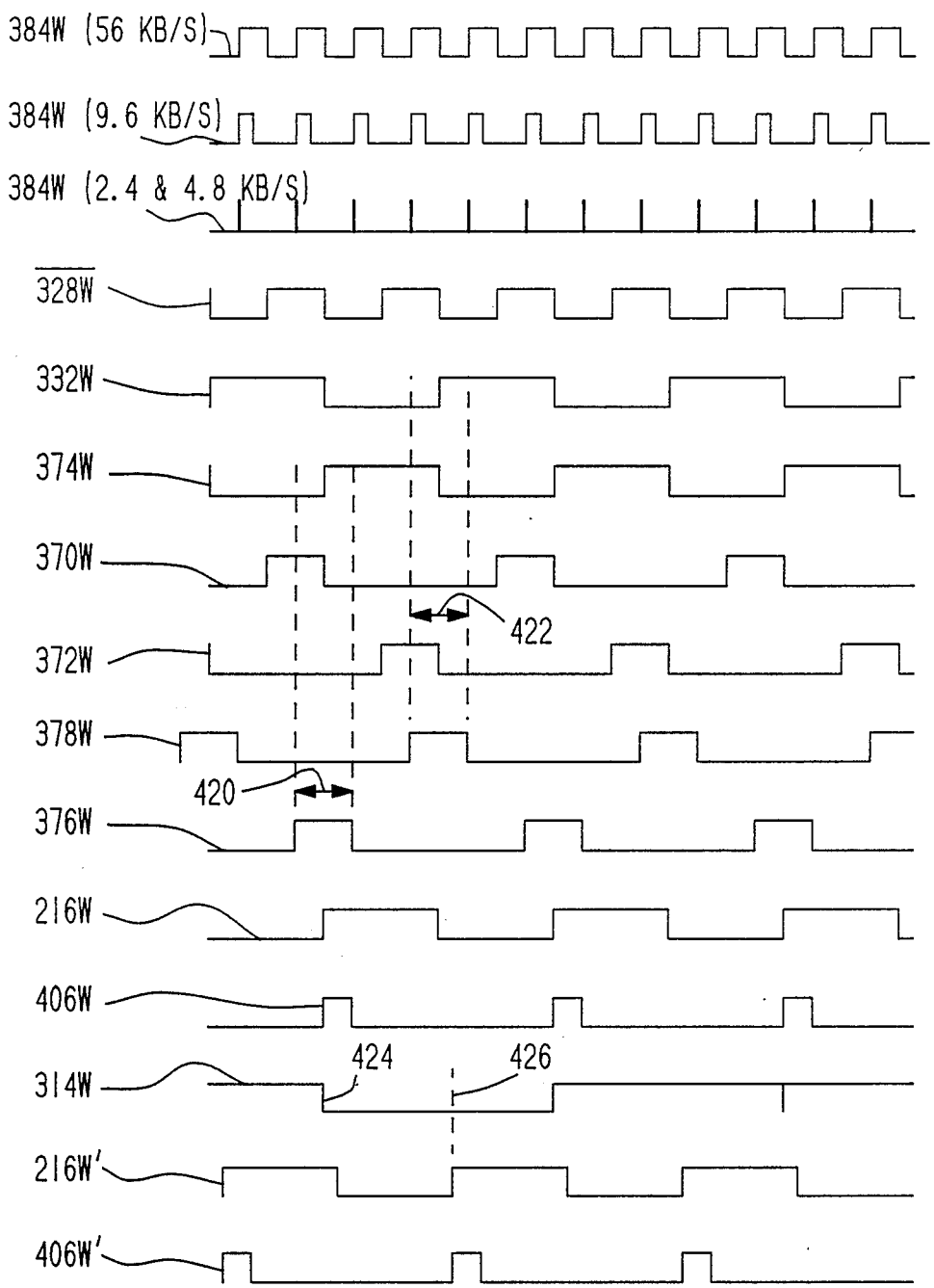
FIG. 16 is a graph of pulse wave forms generated in synchronized customer rate clock circuitry of FIG. 14 for retiming the customer data pulses with respect to the network sync pulse.

The inverted output of the flip-flop 328 is applied to first inputs of AND gates 370 and 372 while the customer rate clock signal on line 332 and its inverse on line 374 are applied to the second inputs of the respective AND gates 370 and 372. The outputs of AND gates 370 and 372 are connected to data inputs of flip-flops 376 and 378, respectively. The least significant bit output of counter 326 is connected by inverter 380 to one input of a AND gate 382 which has its output connected to one input of a NAND gate 384 which drives the clock input of the flip-flops 376 and 378. The second input of AND gate 382 is operated by an inverter 386 which has its input jumper to one of the terminals 388, 390 or 392. At 56 kb/s, the input of inverter 386 is connected to terminal 388 to ground to hold gate 382 enabled. At 9.6 kb/s, the input of inverter 386 is connected to terminal 392 which is connected to the second least significant output of the counter 326. For 2.4 and 4.8 kb/s, the input of inverter 386 is connected to terminal 390 which is connected to the third least significant bit output of counter 326. The second input of AND gate 384 is jumper to terminal 394 to enable gate 384 at 9.6 and 56 kb/s, or to terminal 396 to the second least significant bit output of counter 326 at 2.4 and 4.8 kb/s. The wave forms 384W produced on the output of gate 384 at the respective rates is shown in FIG. 16. The inverted output waveform 328W from flip-flop 328 is gated with the respective waveforms 332W and 374W (synchronized customer rate clock and inverted synchronized customer rate clock) from the non-inverted and inverted outputs of flip-flop 330 to produce respective waveforms 370W and 372W from gates 370 and 372. Clocking of the signals 370W and 372W with the clock 384W in flip-flops 376 and 378 produces waveforms 376W and 378W.

The outputs of flip-flops 376 and 378 are connected to first inputs of respective NAND gates 402 and 404 which have their second inputs connected to the output of a one shot or monostable multivibrator 406 operated by the leading edge of the recovered clock signal on line 216. The outputs of the NAND gates 402 and 404 are connected to the respective clear and preset inputs of a flip-flop 408 which has its non-inverted output connected to one input of NAND gate 410 and has its inverted output connected to one input of NAND gate 412. Second inputs of the gates 410 and 412 are connected to the respective clock and inverted clock lines 332 and 374. The outputs of gates 410 and 412 are connected to a NAND gate 414 which drives the clock inputs of flip-flops 416 and 418 to read the binary rail signals on the respective lines 314 and 316.

As shown in FIG. 16, the outputs 376W and 378W of flip-flops 376 and 378 produce respective windows as shown by the double arrowed lines 420 and 422. The window 422 surrounds the leading edge of the clock signal 332W while the window 420 surrounds the leading edge of the inverted clock signals 374. The reading of the rail signals on lines 314 and 316 by the flip-flops 416 and 418 cannot occur during intervals where the binary rail signals may change state or at the boundary between bits represented in the rail signals as shown for the signal 314W at 424. As shown in FIG. 16 this edge 424 can correspond to the leading edge of the inverted signal 374. Thus, the coincidence of the pulse 406W from one shot 406 with the window 420 results in flip-flop 408 being preset by gate 404. The flip-flop 408 enables gate 410 to utilize the non-inverted clock signal 332 to clock the flip-flops 416 and 418 at time illustrated by the dashed line 426 during which the rail signals 314 and 316 can be safely read. If the rail signals 314 had a relative timing so that they changed state at approximately the dashed line 426, then the recovered clock signal would resemble the wave form 216W' and the pulse output 406W' of one shot 406 coincides with window 422 to operate gate 402 and clear the flip-flop 408 causing gate 412 to be enabled to pass the inverted clock signal 374W for clocking the flip-flops 416 and 418 to avoid reading the rail signals at time 426.

The outputs of flip-flops 416 and 418 are connected to data inputs of respective flip-flops 430 and 432 which are clocked by the clock signal 332. The outputs of flip-flops 430 and 432 on respective lines 434 and 436 are thus rephased to the customer rate clock generator in circuit 66 which has every 6th (2.4, 4.8 and 4.8 kb/s) or every 7th (56 kb/s) pulse synchronized with the telephone network 8K sync signal on line 344.

Figure 18:
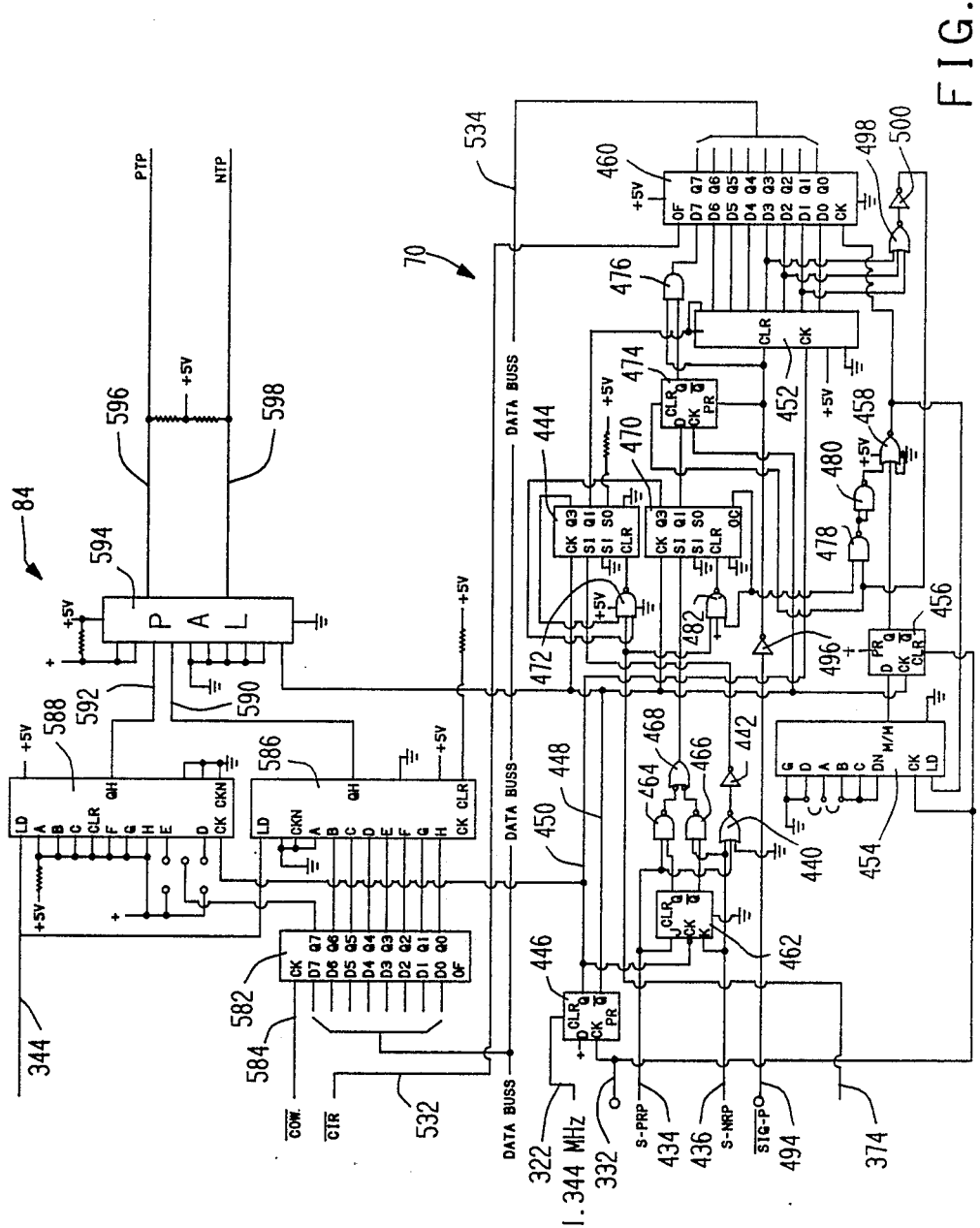
FIG. 18 is a diagram of parallel to bipolar, bipolar to parallel, and violation decoding and incoding circuitry in the unit of FIG. 1.

Referring to FIG. 18, the rephased rail signals 434 and 436 are applied to respective inputs of a NOR gate 440 to produce a single binary output corresponding to the sum of the signals 434 and 436 which is applied by inverter 442 to the serial input of a four bit shift register 444. The network customer rate clock signal 332 is applied to the clock input of a flip-flop 446 which is cleared by the 1.344 MHz reference clock 322 to produce respective negative and positive strobe or clock signals 448 and 450. The negative clock line 448 is connected to the clock input of the register 444 so that the serial customer data from inverter 442 is read upon the trailing edge of the pulses on line 448 into the register 444. The Q1 output of register 444, i.e., the output to which serial input data is shifted on the third clock pulse, is connected to the serial input of an eight bit shift register 452 which is clocked by the positive clock 450 so that upon the fourth clock pulse after the incoming data from inverter 442 is applied to the shifter register 444 the data bit is shifted into the register 452. The number of clock pulses 332 are counted by a counter 454 which has its preset input set to count seven when the OCU is operating at 56 kb/s or has its preset input set to count six when the OCU is operating at 9.6, 4.8 or 2.4 kb/s. When the count of counter 454 reaches 0, a positive output from the counter 454 is applied to the data input of a flip-flop 456 so that upon the next clock pulse 448 the flip-flop 456 applies a pulse through NOR gate 458 to the clock input of an octal register 460 to transfer the parallel output of the shift register 452 to the register 460 so that it may be subsequently read by the computer.

Control codes transmitted over customer lines have their last bit coded as a bipolar violation, i.e., the sixth bit for 2.4, 4.8 or 9.6 kb/s or the seventh bit 456 kb/s is a 1 which has the same polarity of the previously received 1 bit. In order to recognize the bipolar code violation, the rail inputs 434 and 436 are connected to the respective j and k inputs of a flip-flop 462 which is clocked by the trailing edge of the positive clock signal 450. Thus, the flip-flop 462 stores the polarity of the last received bipolar 1 by producing a high non-inverted output when the last pulse was positive and by producing a high inverted output when the last pulse was negative. The non-inverted output of the flip-flop 462 is connected to one input of a NAND gate 464 along with the positive rail line 434 so that an incoming one on line 434 will produce a 0 output from NAND gate 464 if the previously received one was also a positive bipolar bit. Similarly, the inverted output of flip-flop 462 is connected to one input of a NAND gate 466 which has its second input connected to the negative rail line 436 to produce a low output from NAND gate 466 if the previously received bipolar bit was negative to indicate a bipolar violation. A 0 on the output of either NAND gate 464 or 466 is applied to a not OR gate 468 which produces a one applied to the serial input of a serial-in parallel-out shift register 470 to produce a one bit in the shift register 470 during the entry of the sixth or seventh bit into the register 444. The last received bit in register 444 and the just received bipolar code violation bit in register 470 are applied to inputs of an NAND gate 472 which, upon the positive edge of the inverse clock signal 374 clears the register 444. This replaces the XOV violation code with 0s for being shifted into the register 452. Simultaneous with the presentation of the last bit of the incoming byte on the third output of the register 444, the code violation bit in register 470 is presented on its third output which is applied to the data input of a flip-flop 474 so that upon the next clock pulse 448 the inverted output of the flip-flop 474 goes low to apply a low through AND gate 476 to the most significant bit of octal register 460. In the absence of a bipolar violation, the most significant bit input of register 460 is held high to indicate that the incoming byte is a data byte and not a control code.

The bipolar violation control bit in shift register 470 is also utilized to synchronize the counter 454 relative to the incoming bytes. The fourth stage of the shift register 470 has its output connected to one input of a NAND gate 478 which controls both inputs of a NAND gate 480 to apply a signal to a second input of the NOR gate 458. The output of the NOR gate 458, in addition to transferring the parallel data from the shift register 452 into the octal register 460, also applies a signal to the load input of counter 454 to begin the bit counting cycle for a byte of incoming customer data. The output on the fourth stage of the shift register 470 is also applied to one input of a NAND gate 482 which has its other input connected to the inverse clock signal 374 to clear the register 470.

Referring back to FIG. 5, the full wave rectified output on line 214 is applied by an inverter 484 through a diode 486 to an integration circuit formed by a parallel capacitance 488 and resistance 490 connected across the input of an inverter 492. The resistance 490 and capacitance 488 are selected to maintain a charge on the capacitance 488 for a few seconds. However, in the absence of any incoming signal over an extended duration, the capacitance 488 discharges producing a high output from inverter 492 on line 494 which, as shown in FIG. 18, operates inverter 496 to clear the shift register 452. Additionally, the low output on inverter 496 disables AND gate 476 to apply 0 to the most significant bit of the octal register 460. Thus, only 0s are loaded into the octal register 460 when there is no incoming customer signal. The outputs of the fourth, fifth and sixth stages of the shift register 452 are connected to respective inputs of a NOR gate 498 which controls an inverter 500 to disable the AND gate 478 and prevent extraneous incoming signals that may be detected from affecting operation of the counter 454. Additionally, the output of the inverter 496 is connected to the preset input of flip-flop 474 while the output of inverter 500 is connected to the clear input of flip-flop 474.

The microprocessor 342 is a conventional microprocessor, such as a 6801 or 6803-type eight bit microprocessor operating in an expanded multiplexed mode wherein port 3 is used for both the data bus and the low order address lines, and port 4 is used as the high order address lines. In this mode a eight bit latch 502 is employed to capture or demultiplex the low order address bits and an external memory, ROM 504, is used. An integration circuit 510, responsive to the turn on of power, operates serial inverters 512 and 514 to clear a monostable multivibrator 516 to apply a reset signal to the reset input of the microprocessor 342. A second monostable multivibrator 518, triggered by the reset signal, operates the monostable multivibrator 516 to clear the reset signal and begin operation of the microprocessor 342. The monostable multivibrator 416 operates as a watch dog timer which is retriggered during proper operation of the microprocessor 342 by output P13; however, if a malfunction occurs such as by a voltage spike or other condition, the monostable multivibrator 516 would time out resulting in resetting of the microprocessor 342. Resistances and capacitances are connected to the circuit units 516 and 518 to form suitable timing periods for the monostable multivibrators. Switches 520 and 522 and strap terminal pairs 524 and 526 are connected on one side to ground and on their opposite sides to respective inputs of the microprocessor 342 which are biased positive by resistances 528. The switches 520 and 522 are utilized to select a customer remote channel test option and a customer remote test control option, respectively. When the switch 520 is closed, the customer remote channel test option permits an incoming network data service unit loopback control code to operate simplex current change facilities on the customer lines. When the switch 522 is closed the customer remote test control option permits the transmission of a data service unit loopback control code on the outgoing network lines in response to an incoming data service unit loopback control code from the customer. The strap options 424 and 426 determine the customer data rate; for example, both straps 524 and 526 present equals 56 kb/s, strap 526 only equals 9.6 kb/s, strap 524 only equals 4.8 kb/s, and no strap equals 2.4 kb/s.

The higher address outputs of the microprocessor 342 operate a decoder 530 which in turn generates control signals on output lines operating input and output registers for reading data to and from the data bus. For example, output line 532 from decoder 530 operates the tristate octal register 460, FIG. 18, to enable the microprocessor 342 to read an incoming customer byte.

The clock circuit 66 of FIG. 14 also contains a pair of counters 536 and 538 together with a flip-flop 540 for dividing the 1.344 telephone network reference clock signal on line 322 to obtain a 64 khz clock on line 542 and an inverse 64 khz clock on line 544. The synchronizing clear signal on line 358 is applied by respective AND gate arrangements 546 and 548 to load inputs of the counters 536 and 538 to synchronize the 64 khz clock with the eight khz system clock. An inverter 550 connects the maximum output of counter 536 with a second input of the AND gate 546 to divide the signal by 3 while an inverter 552 connects the maximum output of counter 538 to a second input of the AND arrangement 548 to divide the count further by 7. The flip-flop 540 has its preset input driven by the inverter 552, while the three least significant outputs of the counter 538 drive a gating arrangement formed from inverters 554 and 556 and a NAND gate 558 to clear the flip-flop 540 upon receipt of the fourth pulse by the counter 538 from counter 536 after counter 538 has been preset. Thus, the flip-flop 540 generates a pulse on line 542 with a duty cycle of 4/7ths.

In the parallel to serial network output circuit 74, shown in FIGS. 17, a network data byte on data bus 534 from the computer 342 is transferred to a register 560 by a signal on decoder output line 562. The 8K network clock signal 78 is an inverted signal which enables the load input of a parallel-in serial-out shift register 564 so that upon the next 64 k clock pulse 542, the data byte in register 560 is transferred to the shift register 564 to begin the transmission of a serial binary data byte through NAND gate 566 which operates as a buffer inverter applying the signals to line 76 to the network. Additionally, the serial output of the shift register 564 is applied to the JK inputs of a flip-flop 568 clocked by the 64 k clock 542 to produce an output signal, inverted XBO, required by the telephone system.

In the serial to parallel circuit 82, FIG. 17, the incoming network serial data line 80 is biased positive by resistance 570 and applied by resistance 572 to the input of an inverter 574 which has its output applied to the serial input of a serial-in parallel-out shift register 576. The register 576 is clocked by the inverse 64 k clock 544. A octal register 578 has inputs connected to the parallel outputs of the shift register 576 and has its clock input connected to the 8K network clock line 78 so that upon the trailing edge of the 8K clock, the eight bits of data transferred into shift register 576 are loaded into the register 578 for being read subsequently by the computer 72 by operation of output 580 from decoder 530.

The parallel to bipolar violation encoding circuit 84, as shown in FIG. 18, has a register 582 for receiving a customer outgoing data byte from the data bus 534 upon a signal on line 584 from the decoder 530 of the computer, FIG. 17. The first seven bits of the customer byte in register 582 are transferred to a parallel-in serial-out shift register 586 by the sync pulse on line 344. The most significant or eighth bit of the customer output byte is selected to indicate a control code when 0 or low, and the corresponding output of the register 582 is connected to either the fourth (56 kb/s) or fifth (2.4, 4.8 and 9.6 kb/s) input of a parallel-in serial-out shift register 588. The other inputs of the shift register 588, including the fourth or fifth input which is not connected to the register 582, are biased positive. The shift registers 586 and 588 are clocked by the strobe 450 at the customer rate clock to produce corresponding serial outputs which are applied to respective inputs 590 and 592 of a programmable array logic circuit such as type PAL 16R6 programmable array logic circuit which converts the signals into respective positive rail signals on output line 596 and negative rail pulses on lines 598. The pulses or digital one states on line 590 are converted into alternating pulses on lines 596 and 598; 0's or absence of a pulse on line 590 produces 0's or absence of a pulse on both lines 596 and 598. An inverted pulse on line 592 indicating a control code results in the PAL 594 producing an XOV bipolar violation code; the last or X bit will be a one which has the same polarity (line 596 or 598) as the previous one, the next to last bit is always 0, and the second from last or X bit will be 0 or 1 of the proper polarity depending upon whether an even or odd, respectively, number of ones have been produced since the last XOV violation code.

Figure 19:
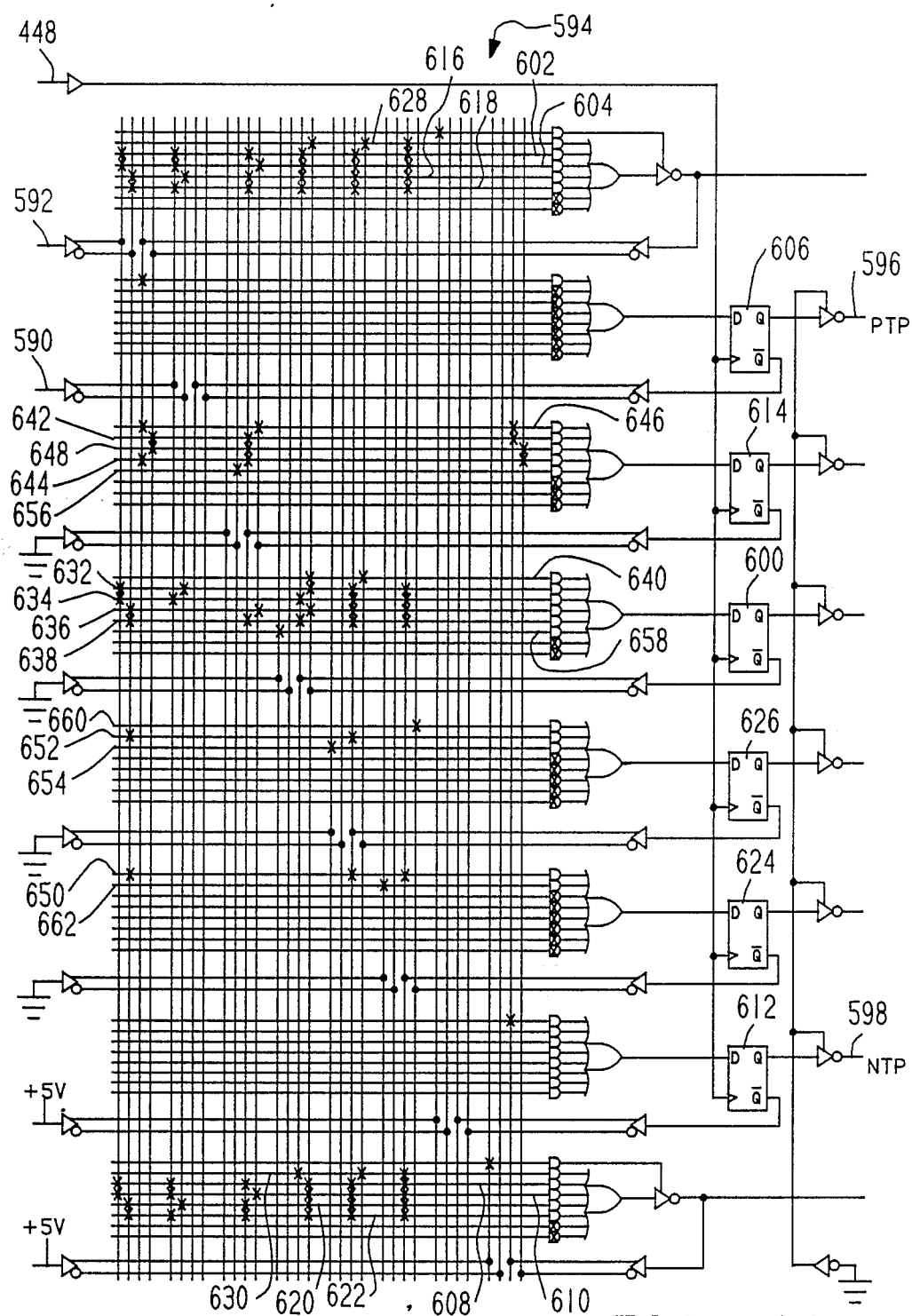
FIG. 19 is a logic diagram of a programmable array logic unit of FIG. 18.

As shown in FIG. 19 the PAL 594 contains vertical lines connected to the inputs and outputs of gates and flip-flops therein which are selectively connected, during programming of the PAL, to horizontal lines forming groups of AND gates, each group of AND gates driving one OR gate which drives an output inverter or flip-flop. Flip-flop 600 indicates the polarity of the last output pulse, i.e., whether the last pulse was produced on positive transmission pulse line 596 or on negative transmission pulse line 598. If flip-flop 600 indicates that the last pulse was produced on line 598, the next input pulse on line 590 is gated over line 602 or 604 to operate flip-flop 606 to produce the next pulse on line 596; and if the flip-flop 600 indicates that the last pulse was produced on line 596, the next input pulse on line 590 operates gate line 608 or 610 to operate flop-flop 612 and produce the next pulse on line 598. Flip-flop 614 indicates whether an odd or an even number of pulses have been produced over the interval since the last XOV bipolar violation. If the flip-flop 614 indicates that an odd number of pulses have been produced since the last bipolar violation, then upon receipt of the pulse on line 592, gate line 616 or 618 drive flip-flop 606 to produce a pulse on line 596 when flip-flop 600 indicates that the last pulse was negative or on line 598, or gate line 620 or 622 drives flip-flop 612 to produce a pulse on line 598 when flip-flop 600 indicates that the last pulse was positive. If flip-flop 614 indicates that the number of pulses received is even, then no pulse is produced on either of lines 596 or 598. Following the pulse on line 592, flip-flops 624 and 626 are operated with the output of flip-flop 624 preventing any output pulse on lines 596 and 598. Upon the last bit (bit 7 for 56 kb/s and bit 6 for 2.4, 4.8 and 9.6 kb/s) flip-flop 624 is deactivated and flip-flop 626 drives either gate line 628 in response to flip-flop 600 indicating that the last pulse was positive to produce a positive pulse on line 596, or gate line 630 when flip-flop 600 indicates that the last pulse was negative to produce a pulse on line 598.

For driving flip-flop 600, AND gate line 632 maintains an operated state of the flip-flop 600 when the incoming bit 590 is 0 and gate line 634 causes the flip-flop 600 to change from the unoperated to an operated state when the incoming bit 590 is one. In response to the negative pulse on line 592, gate line 636 maintains the operated state of flip-flop 600 when flip-flop 614 indicates an even count, and gate line 638 causes flip-flop 600 to change from an unoperated to an operated state when flip-flop 614 indicates an odd count. Gate line 640 maintains the flip-flop 600 in an operated state during the last two bits, OV bits, of a bipolar violation code.

For driving flip-flop 614, gate lines 642 and 644 produce changes in state of the flop-flop 614 when a pulse is produced on either of the lines 596 or 598. Gate line 646 and 648 maintain the state of flip-flop 614 when 0s are produced on both lines 596 and 598.

The flip-flops 624 and 626 are operated by respective gate lines 650 and 652 in response to the negative pulse on line 592. Upon the next clock pulse 448 flip-flop 650 reverts to its unoperated state while AND gate line 624, in response to the operated state of flip-flop 624, maintains the flip-flop 626 operated. Then during the last or V bit bipolar code violation, flip-flop 626 reverts to its unoperated state.

Additional gate lines 656, 658, 660 and 662 are provided for initializing the states of flip-flop 614, 600, 626 and 624.

Figure 4:
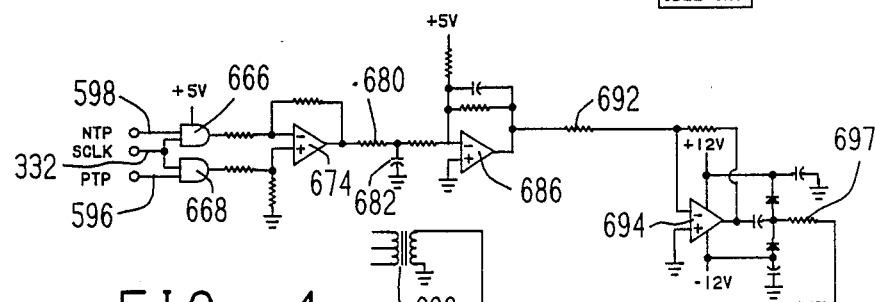
FIG. 4 is a diagram of a modified portion of the output circuit of FIG. 3.

The positive transmit pulse on line 596 and the negative transmit pulse on line 598 are passed to the bipolar output circuit 54 as shown in FIG. 3. The circuit 54 is a line driver which converts these two signals into a balanced bipolar signal having a 50% duty cycle return to 0 format, together with controlling the pulse amplitude and providing filtering. The lines 598 and 596 are connected to inputs of respective AND gates 666 and 668 which have second inputs connected to the customer rate clock 332 so that pulse inputs 598 and 586 are converted to output signals from gate 666 and 668 having a 50% duty cycle. These outputs are connected by resistances 670 and 672 to respective inputs of an operational amplifier 674 which has a bias resistance 676 and a feedback resistance 678 so that the two signals from the AND gates 666 and 668 are differentially added to produce a digital tristate or bipolar signal. The output of amplifier 674 is applied to a low pass filter formed by resistance 680 and capacitance 682 to ground with the junction between resistance 680 and capacitance 682 connected by resistance 684 to the input of an amplifier 686 having a feedback resistance 688 designed to produce amplification of the signal as required to produce proper signal level on the line. The filter component 680 and 682 are selected in accordance with the customer rate; at 56 kb/s the low pass filter formed by resistance 680 and 682 can be eliminated utilizing the feedback capacitance 690 for the amplifier 686 to provide high frequency drop-off. The output of the amplifier 686 is coupled by a resistance 692 to the input of an operational amplifier 694 having a feedback resistance 696 for driving the output transformer 698 through a coupling capacitance 700. For customer rates of 4.8 and 9.6 kb/s, band elimination for 28 khz is provided by an amplifier 702 having its inverting input connected by capacitance 704 to a divider formed by resistances 706 and 708 across the output of the amplifier 686. The filter employs a feedback capacitance 710 connected between the output of the amplifier 702 and the junction of resistances 706 and 708, and employs a feedback resistance 712 to the inverting input of amplifier 702 to provide the proper signal level. Frequency components below 28 khz are eliminated by the capacitance 704 while high frequency components are eliminated by the feedback through capacitance 710 to thus produce an inverted band pass signal from amplifier 702 which is summed through resistance 714 with the signal through resistance 692 to the input of amplifier 694 for eliminating a frequency band at 28 khz to avoid interline coupling problems with customer lines carrying 56 kb/s. As shown in FIG. 4 for 2.4 kb/s, the low pass frequency formed by resistance 680 and capacitance 682 can be selected to adequately attenuate the 28 khz components to meet line specifications.

Transformer 698 is a 2:1 step down transformer. Zener diodes 718 and current limiting resistances 720 provide lightning protection for the line driver on the line side of transformer 698. Diodes 722 provide additional lightning protection on the primary side of transformer 698. Capacitances 724 provide high frequency filtering for the voltage supply to the line driver amplifiers.

Referring back to FIG. 17, the microprocessor 342 contains three additional outputs connected through buffer inverters 730, 732 and 734 to respective lines 736, 738 and 740 which are connected to circuitry in FIG. 3 for operating OCU and CSU loopback circuitry and idle indicating circuitry. The line 736 is connected by a resistance 742 to the base of a transistor 744 which drives a transistor 746 to operate a relay 748. When the relay 748 is operated, normally closed contacts 748a and 748b are opened to disconnect the customer lines 52 and 56 and normally opened contacts 748c are closed to establish a loopback connection between the customer output and input of the office channel unit for testing purposes. Additionally, operation of relay 748 opens normally closed contacts 748D and 748E in series with buildout switches 112 and 114, and closes contacts 748F and 748G in parallel with respective switches 116 and 118 to insert the line buildout attenuator formed by resistances 106 and 108 and capacitance 110 needed for short length lines into the loopback circuit. A light emitting diode 750 in series with a limiting resistance 752 is connected to the collector emitter circuit of the transistor 744 to indicate that the OCU unit is in the loopback mode.

The line 738 is connected by a resistance 754 to the base of a transistor 756 which drives a transistor 758 operating a relay 760 which controls the polarity of the simplex current. In the simplex circuit 86, the plus battery terminal is normally connected through current limiting resistance 762, choke 764 and normally closed contact 760a of the relay 760 to the center tap of the primary winding of the transformer 120 while the negative battery terminal is connected through current limiting resistance 766, choke 768, LED of optical coupler 770, current limiting resistance 772, and normally closed contacts 760b of the relay 760 to the center tap of the secondary winding connected to transmit lines 56 to thus bias the receive lines 52 positive relative to the transmit lines 56. Upon operation of the relay 760, the contacts 760a and 760b are opened and normally opened contacts 760c and 760d are closed to reverse the polarity of the batteries applied to the receive and transmit lines 52 and 56. A light emitting diode 774 in series with a resistance 776 is connected in series with the collector and emitter of the transistor 756 for indicating that the CSU loopback mode is present.

The phototransistor of the optical coupler 770 is connected in series with a resistance 778 and to the base of a transistor 780 which is connected in series with a light emitting diode 782 and current limiting resistance 784 for indicating when no simplex current is in existence. A diode 786 is connected across the LED of coupler 770 and resistance 772 for protecting the coupler 770.

The line 740 is connected in series with a light emitting diode 788 and current limiting resistance 790 to indicate when the circuit is idle.

A program for operating the computer 72 is illustrated in FIGS. 20-32 wherein FIG. 20 is the initializing program called by the reset vectors of the microprocessor. The program begins at point 1002 and proceeds to step 1004 where the ports of the microprocessor are initialized at input ports and output ports as required by the circuitry of FIG. 17. In the next step 1006, memory locations in the internal RAM are cleared. The switches 520 and 522 of FIG. 17 are then read in step 1008 and their condition stored in corresponding memory bits. In step 1010 the status of jumpers or switches 524 and 526 are read and their condition is compared in steps 1012, 1014, 1016 and 1018 with the corresponding states representing a customer data transmission rate of 2.4, 4.8, 9.6 and 56 kb/s, respectively. If any of the steps 1012, 1014, and 1016 is true, then the program branches to the corresponding step 1020, 1022 or 1024 where the number of byte repeats, 20, 10 or 5, are loaded into the microprocesor register for storage in step 1026 in a RAM location, REPEAT and then in step 1028 into a RAM counter, RCOUNT. If the 56K customer rate is true in step 1018, the program jumps to the scan routine SCAN1 at point 1030 in FIG. 22. If one of the subrates is true, then the program from step 1028 jumps to the routine BSCAN1 a point 1032 in FIG. 27.

Figure 22:
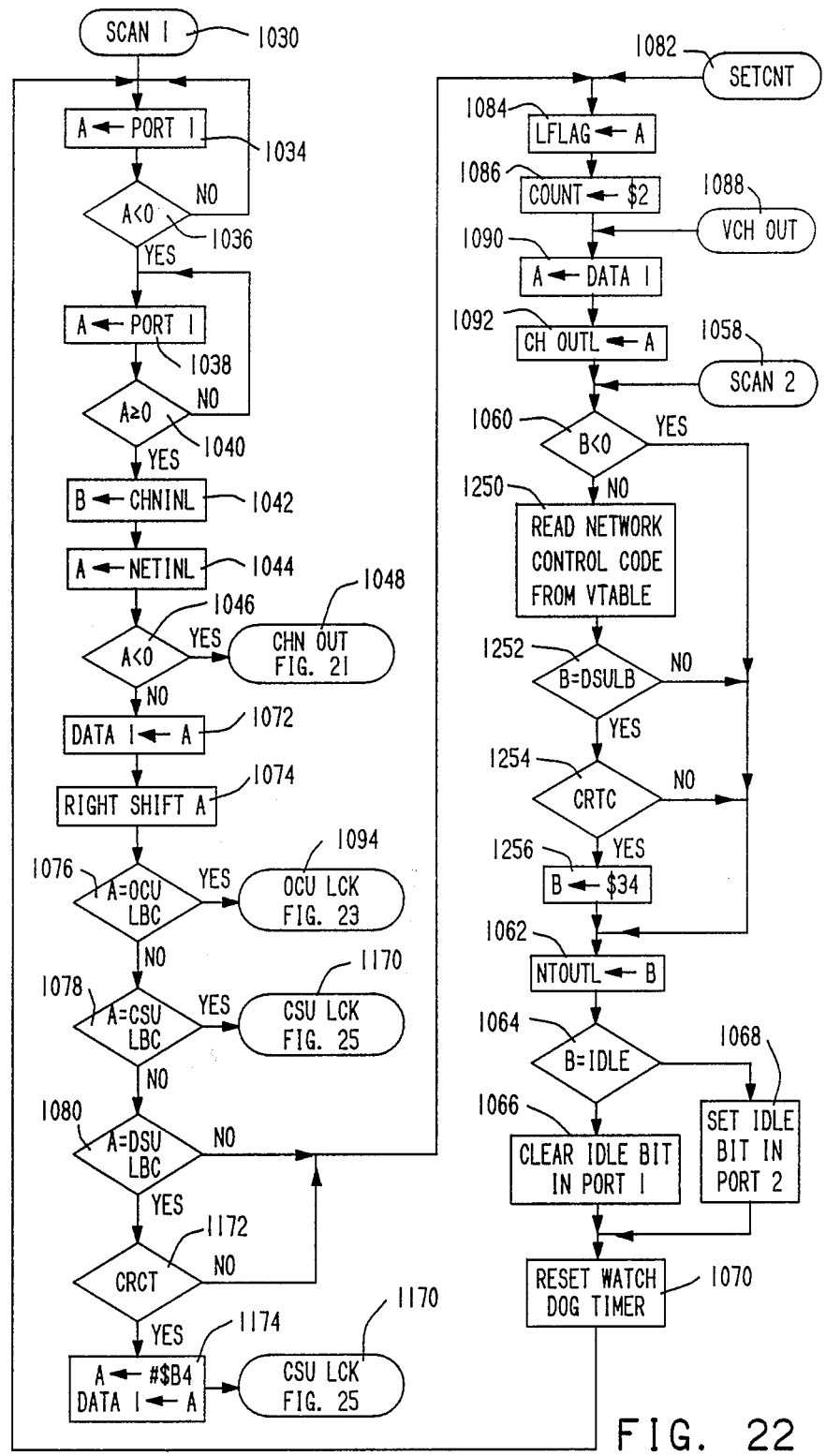
FIG. 22 is a step diagram of a main computer program loop utilized in the computer of FIG. 17 when the customer data rate is 56 kb/s.

Point 1030 in FIG. 22 is the entry point for the main program loop for operating at 56 kb/s. In steps 1034 and 1036 the program reads the line 78 which carries the network 8K negative clock pulse, and recycles when this line is not high. When the line 78 is high indicating that the 8K clock pulse is not present, the program proceeds to steps 1038 and 1040 where the program recycles until the beginning of the negative sync clock pulse on line 78. Once the beginning edge of the negative clock is sensed, the program proceeds to step 1042 where the incoming customer data in register 460, FIG. 18, is read and then to step 1044 where the incoming network data byte in register 578, FIG. 17, is read. In the network input byte, bit 8, when low, indicates that the network byte is a control code, and when high indicates that the data byte is ordinary data. When the network input byte is data in step 1046, the program calls a routine CHNOUT 1048 in FIG. 21 wherein the network input byte is saved in a memory byte LFLAG for storing the last byte transmitted on the customer lines. In the next step 1052, the byte received from the network is compared with a network 0 suppression code and if true is changed to 0 in step 1054. From either step 1052 if false or from step 1054 the program proceeds to step 1056 where the byte received from the network is stored in the register 582, FIG. 18, for being transmitted to the customer. From the step 1056, the program returns to point 1058 of the main loop in FIG. 22.

At point 1058 the program at step 1060 tests the input byte from the customer for being a data byte, i.e., is bit 8 high indicating data. When true, the program branches to step 1062 where the customer input byte is written into the network output data register 560, FIG. 17. In the next step 1064, the customer data byte is compared with an idle code and if false the idle bit is cleared in step 1066. If step 1064 is true the idle bit is set in step 1068. The idle bit drives inverter 734 in line 740 in FIG. 17 to operate the idle indicating LED 788 in FIG. 3. From step 1066 or 1068, the program proceeds to step 1070 where the timer 516, FIG. 17, is reset prior to returning to the beginning point 1030 of the procedure SCAN1. In the event that a malfunction occurs, for example, such as could be caused by a sudden voltage spike, the microprocessor 342 could be possibly hung up and running of the timer 516 would reset the microprocessor to overcome the malfunction.

When the network data byte loaded in step 1044 is a control code, its eighth bit will be 0 resulting in step 1046 branching to step 1072 where the network byte is stored in a RAM memory location DATA1 recording the last network control code. The network byte in step 1074 is right shifted to remove the first bit and the remaining bits are compared in steps 1076, 1078 and 1080 to an office channel unit loopback code, customer service unit loopback code, and data service unit loopback code, respectively. If the control code is none of these, then the program proceeds to a point SETCNT 1082 where the shifted network byte is stored in a RAM memory location LFLAG flag in step 1084. In the next step 1086, the number 2 is loaded in a memory counter COUNT utilized for counting three successive loopback codes. From step 1086 the program proceeds to point 1088 where the byte stored in step 1072 is read in step 1090 and then transmitted in step 1092 to the customer output register 582 in FIG. 18. From step 1092 the program proceeds to point 1058.

Figure 23:
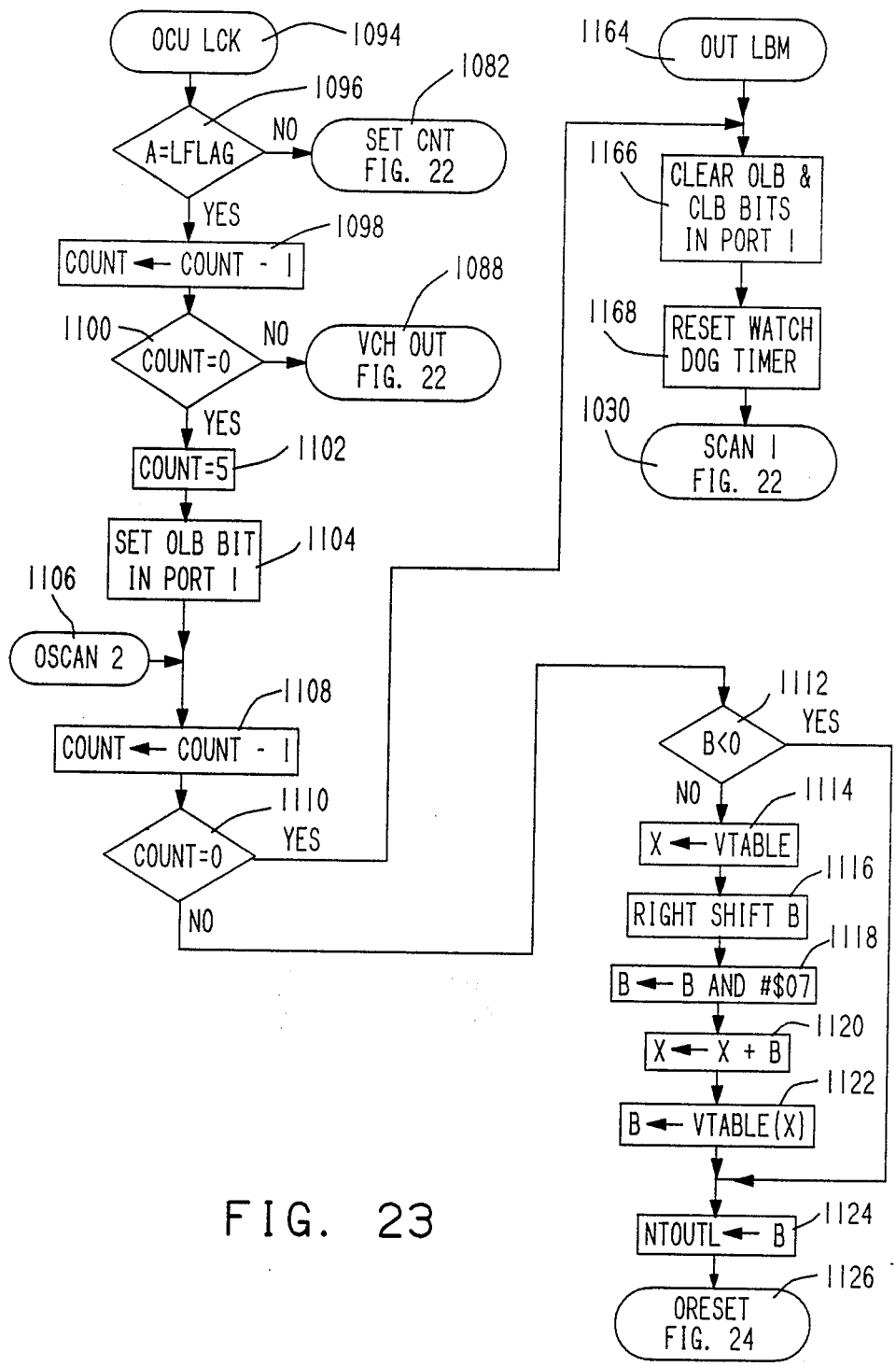
FIG. 23 is a step diagram of a program routine for operating under an office channel unit loopback mode which is called by the program of FIG. 22.

If the network input byte is found to be an office channel loopback code in step 1076, the program proceeds to point 1094 of the routine in FIG. 23 where step 1096 compares the left shifted network byte with the byte previously stored in step 1084. If false, the program returns to point 1082 of FIG. 22 for storing the current shifted byte in LFLAG and setting COUNT to 2. If step 1096 is true, COUNT is decremented in step 1098 with the program in step 1100 branching back to point 1088 in FIG. 22 until COUNT reaches 0. Thus, three successive office channel unit loopback code bytes must be received prior to proceeding to step 1102 where COUNT is reset to 5 and then step 1104 where the OLB bit is set driving inverter 730 and line 736 in FIG. 17 which operates the relay 748, FIG. 3, to open contacts 748a and 748b disconnecting the customer lines 52 and 56 and closing contacts 748c to establish a loopback circuit in the office channel unit. From step 1104 the program proceeds to point 1106 where step 1108 decrements COUNT. In the next step 1110, the program branches to step 1112 while COUNT remains greater than 0. In step 1112 the eighth bit of the customer data byte is checked to determine if the byte corresponds to a control or data code, and if the byte corresponds to a control code, the program proceeds to step 1114 where the memory address of Table II is loaded in the index register. This table contains the corresponding network control codes.

TABLE II

| Address | Network Control Code |
|---|---|
| FB8E | 01111001 |
| FB8F | 01000011 |
| FB90 | 10000100 |
| FB91 | 01010111 |
| FB92 | 01001001 |
| FB93 | 01011111 |
| FB94 | 01001101 |
| FB95 | 01111111 |

In step 1116 the customer byte is shifted right to get rid of the "don't care" lower significant bit and in step 1118 the five most significant bits are eliminated. The remaining three bits are added to the address in the index register in step 1120 so that in the following step 1122 the corresponding network control code can be loaded in register B from Table II. From step 1122 or from step 1112 if 1112 is true, the program proceeds to step 1124 where the network control code from step 1122 or the data byte read from register 460, FIG. 18, in step 1042 of FIG. 22 or from a similar step in the ORESET routine of FIG. 24 is transferred to the network output register 560, FIG. 17.

Figure 24:
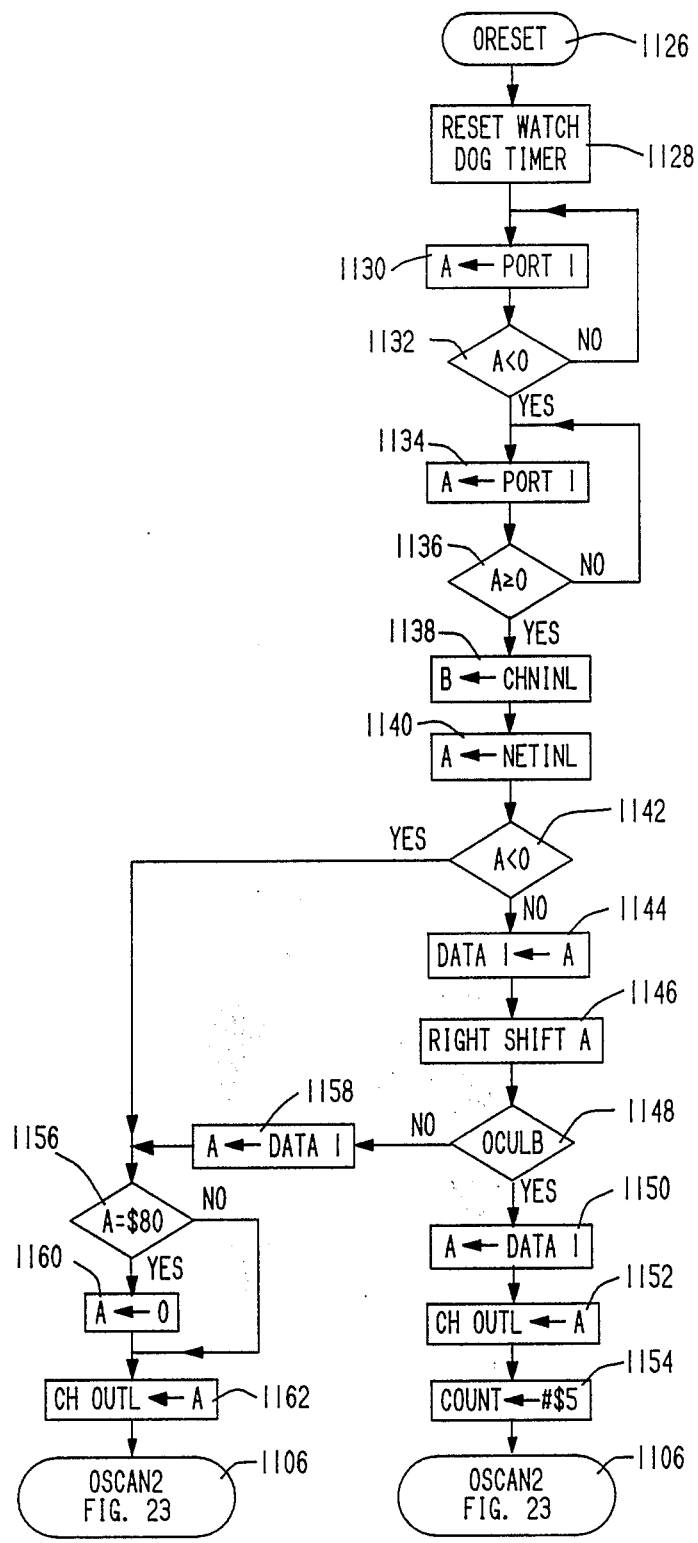
FIG. 24 is a step diagram of a further portion of the program routine of FIG. 23.

From step 1124, the program proceeds to point 1126 in the ORESET routine of FIG. 24 where step 1128 resets the watch dog timer similar to step 1070 in FIG. 22. The following steps 1130, 1132, 1134, 1136, 1138 and 1140 are similar to steps 1034, 1036, 1038, 1040, 1042 and 1044 of FIG. 22 for waiting until the leading edge of the next 8K timing pulse and inputting the incoming customer data byte into register B, which during office channel unit loopback will be the same as the outputted customer channel byte, and loading the incoming network code into the microprocessor register A. If the incoming network byte is a control code, step 1142 branches to step 1144 where the byte is stored in memory DATA1. Then in step 1146 the network byte is shifted left to eliminate the "don't care" bit with the remaining bits compared in step 1148 with the office channel unit loopback code. If true in step 1148 the program proceeds to step 1150 where the byte stored in step 1144 is reloaded into register A. This byte is then written to the customer output register 582, FIG. 18, in step 1152. The counter is reset to 5 in step 1152 and the program returns to point 1106 in FIG. 23. Thus, while the office channel unit loopback code continues to be transmitted to the office channel unit over the network input lines, the program continues to cycle through points 1106 and 1126.

If the network input bYte in step 1142 is a data byte the program branches to step 1156. In step 1148, if the control code is not an office channel loopback code the program branches to step 1158 where the network byte stored in step 1144 is reloaded into the A register and the program proceeds to step 1156. In this step the network byte is compared with a network 0 suppression code and if true proceeds to step 1160 where a 0 is loaded into the A register. From step 1160 or from step 1156 if false, the program proceeds to step 1162 where the byte in register A is transferred to the customer output register 582. From step 1162 the program returns to point 1106 in FIG. 23. After receipt of five successive network bytes which are not an office channel loopback code, COUNT becomes equal to 0 and in step 1110 of FIG. 23 the program branches to point 1164 where step 1166 removes the bits driving inverters 730 and 732 and lines 736 and 738 of FIG. 17 to deenergize the relay 748 of FIG. 3 and thus discontinue the office channel loopback. From step 1166, the program proceeds to step 1168 where the watch dog timer is reset and then to the beginning point 1030 of the routine of FIG. 22.

Figure 25:
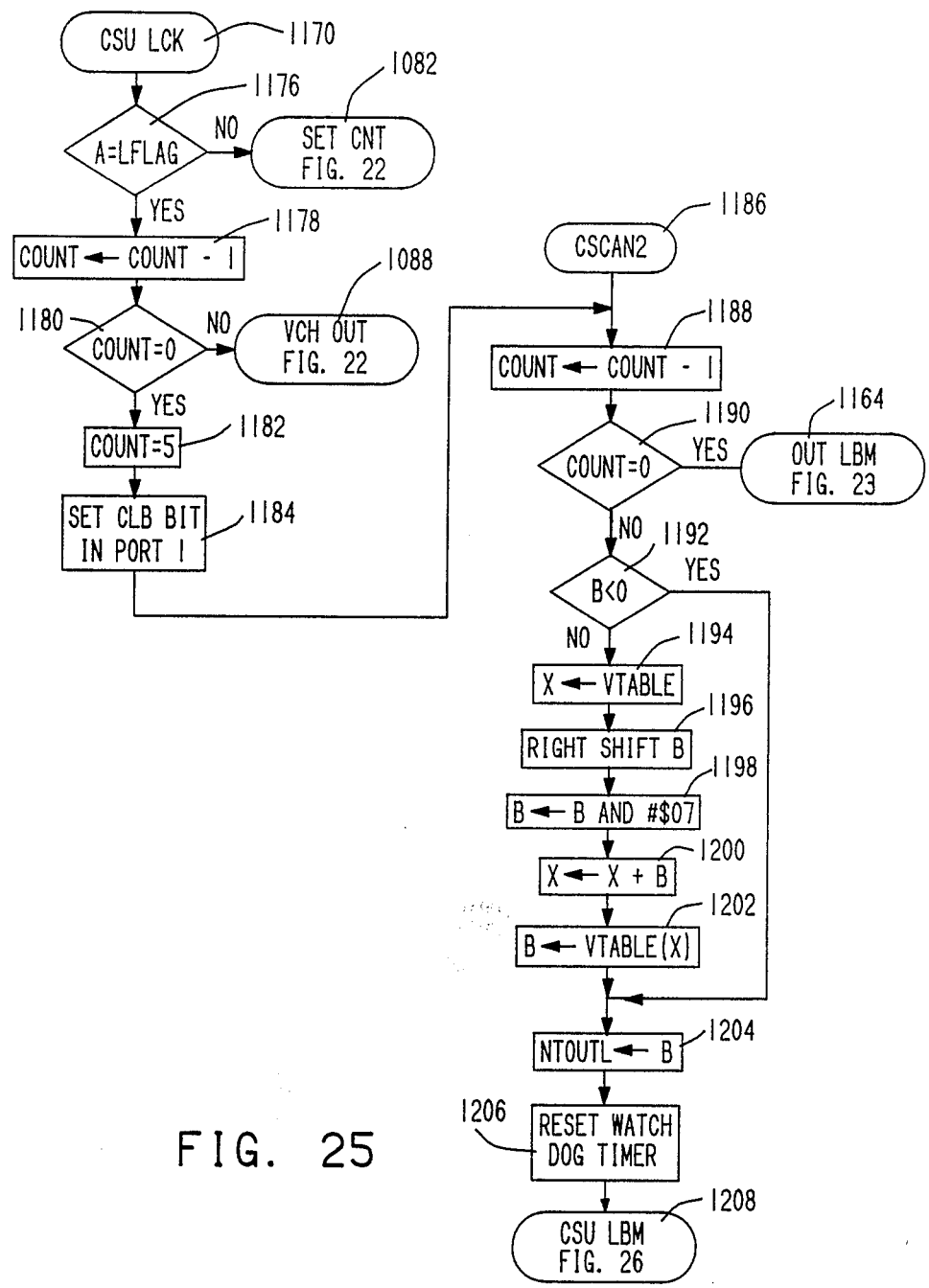
FIG. 25 is a step diagram of a program routine for operating under a customer unit or service unit loopback mode which is called by the program of FIG. 22.
Figure 26:
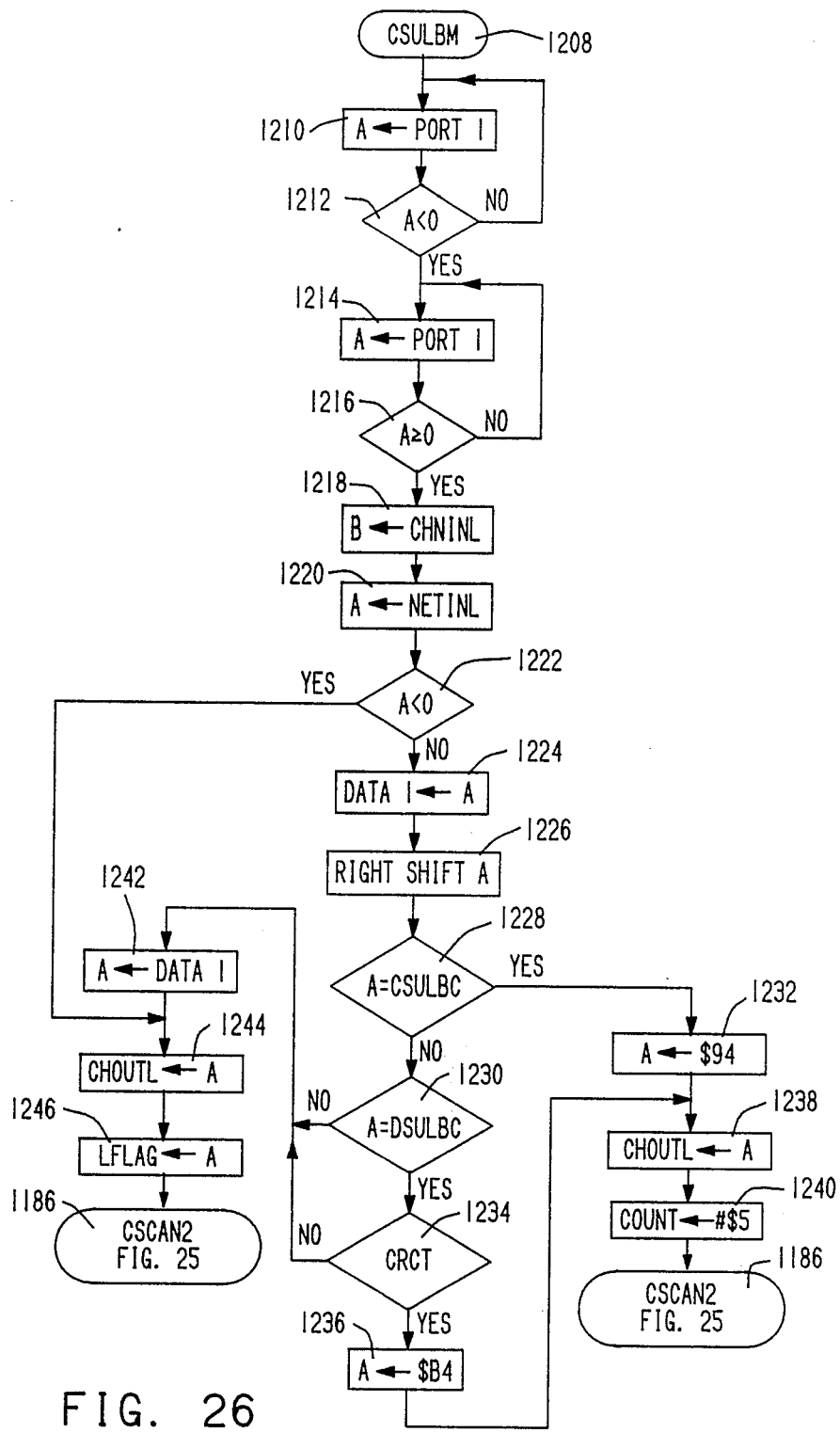
FIG. 26 is a step diagram of a further portion of the program routine of FIG. 26.

Referring back to FIG. 22, if the network input byte is a customer service unit loopback code, the program, in step 1078, branches to point 1170 in FIG. 25. Also in FIG. 22, if the network input byte is a data service unit loopback code, the step 1080 will be true branching to step 1172 where the status of the memory location relating to CRCT switch 520 is polled. If step 1172 is false the program branches to point 1082, and if true, the program branches to 1174 where the corresponding data service unit loopback code for being transmitted on the customer lines is loaded into the A register and then stored in the memory location data one. Then the program proceeds to point 1170 in FIG. 25.

Steps 1176, 1178, 1180 and 1182 of FIG. 25 are similar to steps 1096, 1098, 1100 and 1102 in FIG. 23 for requiring three successive customer service unit loopback codes or three successive customer service unit or data service unit loopback codes prior to setting COUNT equal to five and proceeding to step 1184 where the microprocessor 342 operates the inverter 732 to drive line 738 which in FIG. 3 operates relay 760. Contacts 760a, 760b are opened and contacts 760c and 760d are closed to reverse the polarity of the simplex current 86 applied to the receive lines 52 and transmit lines set 56. This reversal in simplex voltage causes the customer service unit or data service unit at the customer end of the line to establish a loopback circuit for enabling testing of the customer lines.

From step 1184 in FIG. 25 the program proceeds to point 1186 and steps 1188 and 1190 which, similar to steps 1108 and 1110 in FIG. 23 decrement COUNT to provide for a branch to point 1164 after five successive network input bytes which are neither a customer service unit loopback code or a data service unit loopback code. While COUNT is greater than 0 the program proceeds to the routine represented by steps 1192, 1194, 196, 1198, 1200, 1202 and 1204 which is similar to the corresponding steps 1112, 1114, 1116, 1118, 1120, 1122 and 1124 in FIG. 23 for transferring the incoming customer data byte to the network output register 560, FIG. 17, if the byte is a data byte, or selecting the appropriate network control code from Table II and transferring this to the network output register if the customer data byte is a control code. In step 1206 the timer 516, FIG. 17, is reset and the program proceeds to step 1208 in FIG. 26.

The first seven steps of the routine in FIG. 6, namely, steps 1210, 1212, 1214, 1216, 1218, 1220 and 1222 are similar to the steps 1130, 1132, 1134, 1136, 1138, 1140 and 1142 of the routine in FIG. 24 for waiting until the rising edge of the 8K network clock pulse and then inputting the customer data byte from register 460 and the network data byte from register 578. If the network input byte is a control code, the circuit branches in step 1122 to steps 1224 and 1226 where the network data byte is first stored in memory DATA1 and then the byte is shifted left to remove the "don't care" bit. The shifted network byte is compared in the respective steps 1228 and 1230 to the network customer service unit loopback code and data service unit loopback code, respectively. If the network byte corresponds to the customer service unit loopback code in step 1228 the program proceeds to step 1232 where the corresponding customer control code for customer service unit loopback is loaded in register A. If the network byte is a data service unit loopback code in step 1230, the program proceeds to step 1234 where the CRCT option, the stored memory status of switch 522 in FIG. 17, is checked and if true proceeds to step 1236 where the corresponding customer code for data service unit loopback is loaded in register A. From step 1232 or step 1236 the program proceeds to step 1238 where the customer code for channel service unit loopback or data service unit loopback is transferred to the customer output register 582, FIG. 18. In the next step 1240 the count is reset to five and the program returns to point 1186 of FIG. 25.

If the network control code is neither a customer service loopback code in step 1228, nor a data service unit loopback code in step 1230 or if the control code is a data service unit loopback code in step 1230 but the CRCT option is not available in step 1234, then the program proceeds to step 1242 where the byte previously stored in step 1224 is again loaded in register A. From step 1242 or from step 1222 if the network input byte of step 1220 is a data byte, the program proceeds to step 1244 where the network input byte is output to the customer output register 582. In the next step 1246 the customer output byte is stored in memory LFLAG and the program proceeds to point 1186 of FIG. 25. After five successive network input bytes which are neither a customer service unit loopback code or a data service unit loopback code when the CRCT option is available, the program in step 1190 of FIG. 25 branches to point 1164 of FIG. 23 to discontinue customer service unit and data service unit loopback by discontinuing the signal on line 738, FIG. 17, which results in deenergization of relay 748, FIG. 3, to return the simplex voltage polarity on input and output terminals 52 and 56 to the non-loopback condition.

Referring back to FIG. 22, the program from step 1060 proceeds to step 1250 when the channel input byte from step 1092 corresponds to a control code. In step 1250 the corresponding network control code is read from Table II by a procedure identical to that shown by steps 1114, 1116, 1118, 1120 and 1122 of FIG. 23. The network control code is compared in the next step 1252 with the network data service unit loopback code and if false branches to step 1062. If true the program proceeds to step 1254 where the CRTC option, i.e., is the customer permitted to call for a data service unit loopback, is checked. If true the program proceeds to step 1256 where the corresponding network data service unit loopback code is loaded into the B register. If step 1252 or 1254 are false or from step 1256 the program proceeds to step 1062 where the network control code in register B is transferred to the network output register 560, FIG. 17.

The routines for operating at the subrates, 9.6, 4.8 and 2.4 kb/s, are illustrated in FIGS. 27–32. These routines differ from the routines of FIGS. 21–26 for 56 kb/s in that reading of the customer input register 460 and the network input register 578 and writing of the customer output register 482 are performed only once every fifth, tenth or twentieth 8K network clock pulse. Each customer input byte, once read and reformatted to network data or control codes, is repeatedly written to the network output register 560 for five, ten or twenty times. Additionally, the subrate customer data bytes, being only six bits in length, require different formatting by the microprocessor 342 than the seven bit 56 kb/s customer byte.

Figure 27:
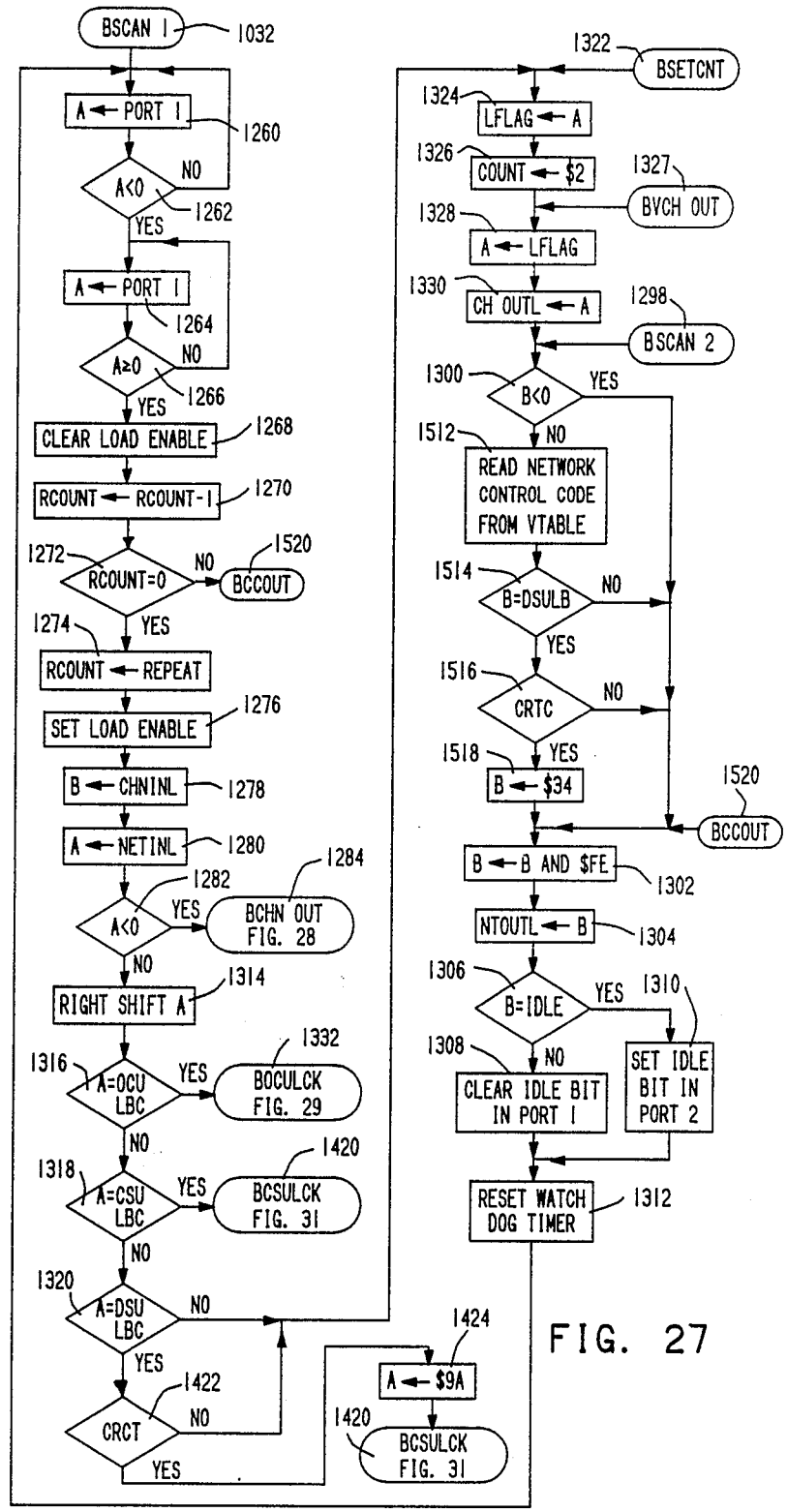
FIG. 27 is a step diagram of a main program loop called by the initialization program of FIG. 20 when the computer of FIG. 17 is operating in a customer data rate of 9.6, 4.8 or 2.4 kb/s.

In the main routine loop BSCAN1 called at point 1032 in FIG. 27, steps 1260, 1262, 1264 and 1266, similar to steps 1034, 1036, 1038 and 1040 of FIG. 22, detect the leading edge of the 8K network clock pulse. In the next step 1268 the load enable bit is cleared to disable the AND gate 340, FIG. 17, and prevent subsequent 8K clock pulses on lines 78 from passing to line 344. In step 1270, the count in RCOUNT is decremented, and then in step 1272 this count is checked for being equal to 0. When true, the program proceeds to step 1274 where the number of repeats, i.e., five, ten or twenty, is reloaded into RCOUNT. Then in step 1276, the load enable bit is set to enable AND gate 340 so that the next 8K clock pulse can pass through the AND gate. The timing from step 1266 to step 1267 is selected to be greater than the width of the 8K timing pulse so that the load enable bit will not be set during the 8K clock pulse. In the next steps 1278, 1280 and 1282, similar to steps 1042, 1044 and 1046, FIG. 22, the customer input byte and network input byte are loaded and the program branches to point 1284 of FIG. 28 when the network input byte is a data byte.

In the routine of FIG. 28, the network byte is reformatted to produce a customer byte by shifting the byte one bit to the right in step 1286 and masking or eliminating the two left or most significant bits in step 1288 to thus form the customer six bit byte. When this byte is greater than 0 the program proceeds from step 1290 to 1292 where the eighth bit is made high. From step 1292 or from step 1290 if the byte in step 1290 is equal to 0, the program proceeds to steps 1294 and 1296 where the channel output byte is stored in memory and channel output register 582 prior to returning to point 1298 of FIG. 27.

At point 1298 in FIG. 27 the program tests the customer input byte in step 1300 and if the byte is a data byte, rather than a control code, the program branches to step 1302 where the right or lowest significant bit is masked prior to being ouputted in step 1304 to the network output register 560, FIG. 17. From the following step 1306 comparing the network output byte to an idle code, the program proceeds to step 1308 where the idle bit is cleared when the network output byte is not an idle code, or to step 1310 where the idle bit is set when the network output byte is an idle code. From steps 1308 and step 1310 the program proceeds to step 1312 where the watch dog timer 516, FIG. 17, is reset prior to returning to the beginning point 1032 of the routine of FIG. 27.

When the network input byte is a control code as indicated by bit eight being 0, the program proceeds from step 1282 to step 1314 where the network input byte is shifted right by one bit to eliminate the "don't care" bit, and then to steps 1316, 1318 and 1320 where the network input byte is compared to the office channel unit loopback code, the customer service unit loopback code, and the data service unit loopback code, respectively. If all of steps 1316, 1318 and 1320 are false, the program proceeds to point 1322 where the right shifted control code is stored in the memory location LFLAG in step 1324. Then the memory counter is set to two in step 1326. Then in step 1328 the shifted control code is reloaded into the microprocessor register A and transferred to the customer output register 582, FIG. 18, in step 1330 prior to proceeding to point 1298.

If the comparison for the office channel unit loopback code is true in step 1316, the program branches to step 1332 of the routine in FIG. 29 where the shifted control code is compared with the previous control code stored in LFLAG in step 1334. When step 1334 is false the program returns to point 1322 of FIG. 27 to store the present shifted control code in LFLAG and set the count at two. When step 1334 is true, the count is decremented in step 1336. In step 1338 the program branches back to point 1327 of FIG. 27 until the count reaches 0 indicating that three successive office channel unit control codes have been received whereupon the count is reset to five in step 1340. From step 1340, the program proceeds to step 1342 where the output of microprocessor 342 operates inverter 730 to produce an OLB signal on line 736 which operates relay 748 of FIG. 3 to open contacts 748a and 748b and to close contact 748c to establish a loopback circuit in the office channel unit.

From step 1342 the program proceeds to point 1344 which begins the program loop for operating while in an office channel unit loopback mode. In step 1346 COUNT is decremented and in step 1348, the program branches to step 1350 while COUNT remains greater than 0. In step 1350, the program braches to point 1352 when the customer input byte is a data byte as indicated by its bit eight being one. At point 1352, the first or least significant bit of the byte is made equal to 0 in step 1354 and then this customer byte is transferred to the network output register 560 in step 1356. When the customer input byte is a control code, the program proceeds through steps 1358, 1360, 1362, 1364 and 1366 wherein the second, third and fourth bits of the control code form a binary number which is added to the address of the network control code table so that the corresponding network control code can be selected from Table II in step 1366. From step 1366 the program proceeds to steps 1354 and 1356 to output the network control code.

Figure 30:
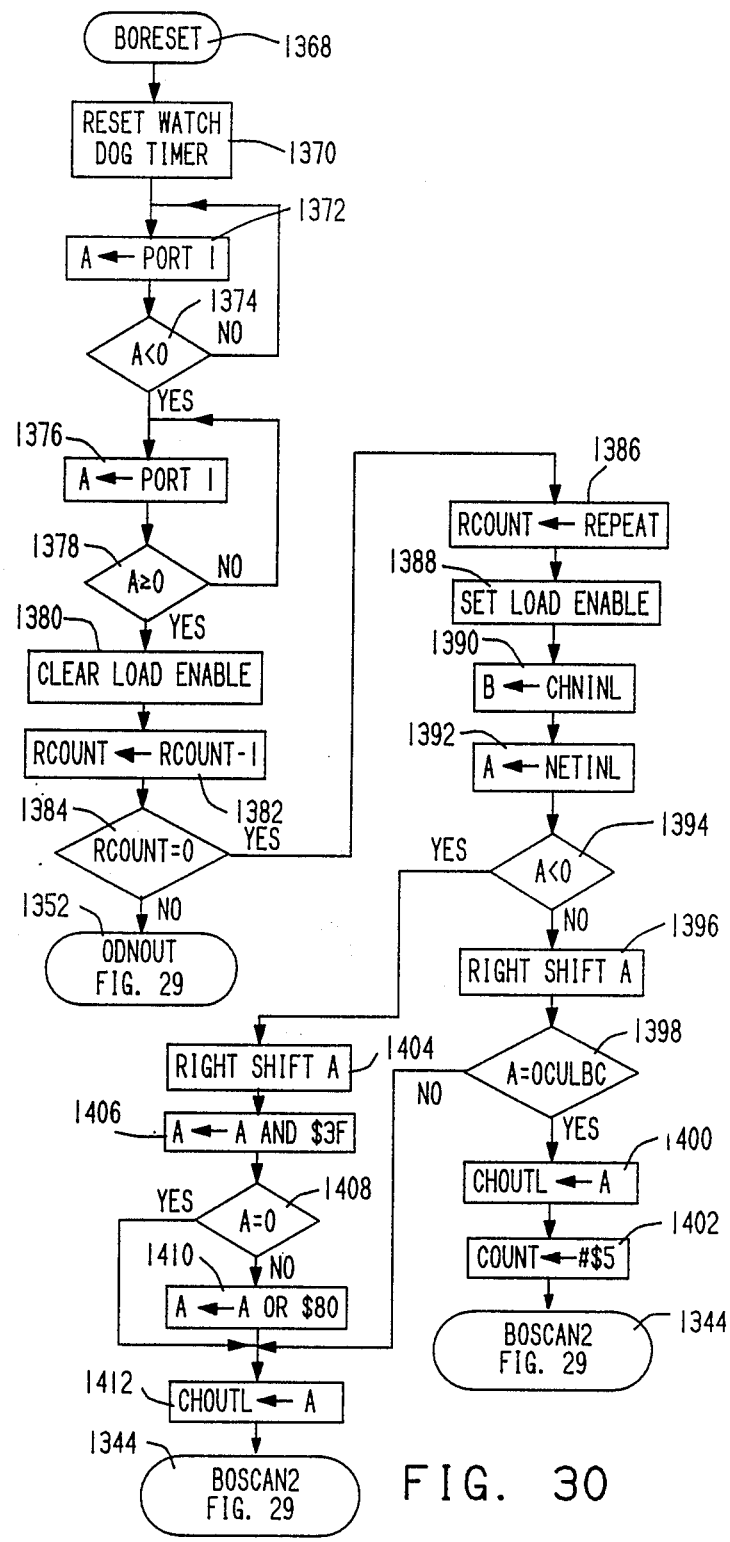
FIG. 30 is a step diagram of a further portion of the program routine of FIG. 29.

From step 1356, the program proceeds to point 1368 of FIG. 30 where the watch dog timer 516 is reset in step 1370. Then in steps 1372, 1374, 1376, and 1378, the program waits until the leading edge of the next 8K network clock pulse. From step 1378 the program proceeds to step 1380 where the load enable bit is cleared and then to step 1382 where the RCOUNT is decremented. In the following step 1384, RCOUNT, while greater than 0, results in a branch back to step 1352 of FIG. 29 to repeat the transmission of the incoming channel byte over the network output.

When the RCOUNT reaches 0, indicating that five, ten or twenty network 8K clock pulses have occurred, the program proceeds to step 1386 wherein the appropriate RCOUNT is restored. In step 1388 the program sets the load enable bit to enable AND gate 340 so that the next 8K network clock pulse can pass to sync line 344. The customer input byte from register 460 and the network input byte from register 578 are read in the next two steps 1390 and 1392. When the network input byte is a control code, the next step 1394 causes a branch to step 1396 where the network byte is shifted to the right one bit. This shifted byte is then compared with an office channel unit loopback code in step 1398, and if true results in advancing to step 1400 where the office channel unit loopback code is transferred to the customer output register 582 and then to step 1402 where the count is reset at five prior to returning to the beginning point 1344 of the office channel unit loopback procedure.

If the incoming network byte is a data byte, the program branches in step 1394 to step 1404 where the byte is shifted right one bit and then to step 1406 where the left two bits, bits seven and eight, are rendered 0. If the reformed byte from step 1406 is not equal to 0, then the program proceeds from step 1408 to 1410 where the eighth bit is rendered one to indicate that the byte is a data byte which is then transferred to the channel output register 582 in step 1412. When the reformed byte is 0, the program branches directly from step 1408 to step 1412 leaving the eighth bit 0 which will cause the PAL 594 to generate an XOV violation code and thus prevent transmissions of long strings of 0s over customer data lines. The program also branches directly from step 1398 to step 1412 when the network input byte is a control code which is not an office channel unit loopback code. From step 1412 the program proceeds to point 1344 at the beginning of the office channel unit loopback loop in FIG. 29.

When the count in step 1348 of FIG. 29 is found to be 0 indicating that five successive network input bytes have not been equal to an office channel unit loopback code, the program proceeds to point 1414 where the control outputs of microprocessor 342 are changed in step 1416 to clear any control signals on lines 736 and 738 setting the office channel unit in the office channel loopback mode or customer service unit loopback mode. From step 1416 the program proceeds to step 1418 where the watch dog timer is reset and then returns to point 1032 of FIG. 27.

Figure 31:
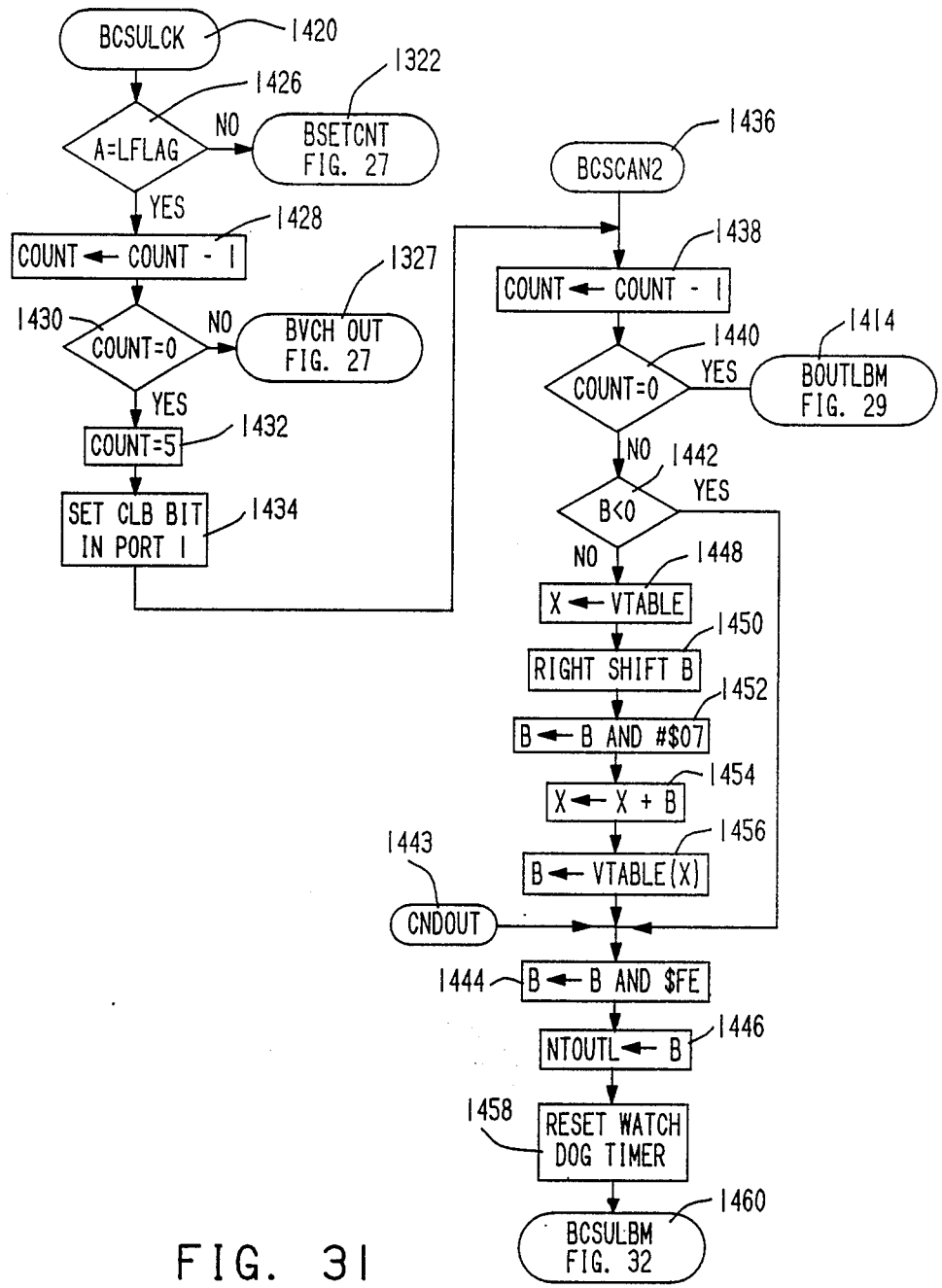
FIG. 31 is a step diagram of a program routine for operating under a customer service unit or data service unit loopback mode which is called by the program of FIG. 27.

When the network input byte is a customer service unit loopback code in the procedure of FIG. 27, the program at step 1318 branches to point 1420 of FIG. 31. Point 1420 will also be called when step 1320 is true for the presence of a data service unit loopback code and the CRCT option is found true in step 1422 indicating that the data service unit loopback mode is permissible for the connected customer lines. If step 1422 is false the program will go to point 1322. From step 1422 when true, the program proceeds to step 1424 where the customer data service unit loopback data byte is loaded into the A register prior to proceeding to point 1420.

From point 1420 in FIG. 31, the program proceeds steps 1426, 1428 and 1430 which, similar to steps 1334, 1336 and 1338 of FIG. 29, result in the requirement that three successive customer service unit or data service unit loopback codes must be received prior to going into the corresponding loopback mode. Once this requirement is met, the program proceeds from step 1430 to step 1432 where the count is set to five and then to step 1434 where the microprocessor 342 operates inverter 732 to produce a signal on line 738 which operates relay 760 in FIG. 3 to open contacts 760a and 760b and close contacts 760c and 760d to reverse the polarity of the simplex voltage applied to receiving lines 52 relative to transmitting lines 56. This reversal of simplex voltage will command the loopback mode in the customer service unit or data service unit.

The program then proceeds to point 1436 which is the beginning point for the program loop for operating in the customer service unit loopback or data service unit loopback mode. In step 1438 the count is decremented and while greater than 0 proceeds from step 1440 to step 1442 where the eighth bit of the customer input byte is tested. If the byte is a data byte as indicated by bit eight being one, the program branches to step 1444 where the lowest significant bit is made 0 and then to step 1446 where the byte is transferred to the network output latch 560. If the byte is found to be a control code in step 1442 the program proceeds through steps 1448, 1450, 1452, 1454 and 1456 which, similar to steps 1358, 1360, 1362, 1364 and 1366 of FIG. 29, retrieve the corresponding network control code from Table II. From step 1456 the program then proceeds to point 1433 and steps 1444 and 1446 where the network control byte is formatted and output on the network output latch. From step 1446 the program proceeds to step 1458 where the watch dog timer is rese and then to point 1460 of FIG. 32.

Figure 32:
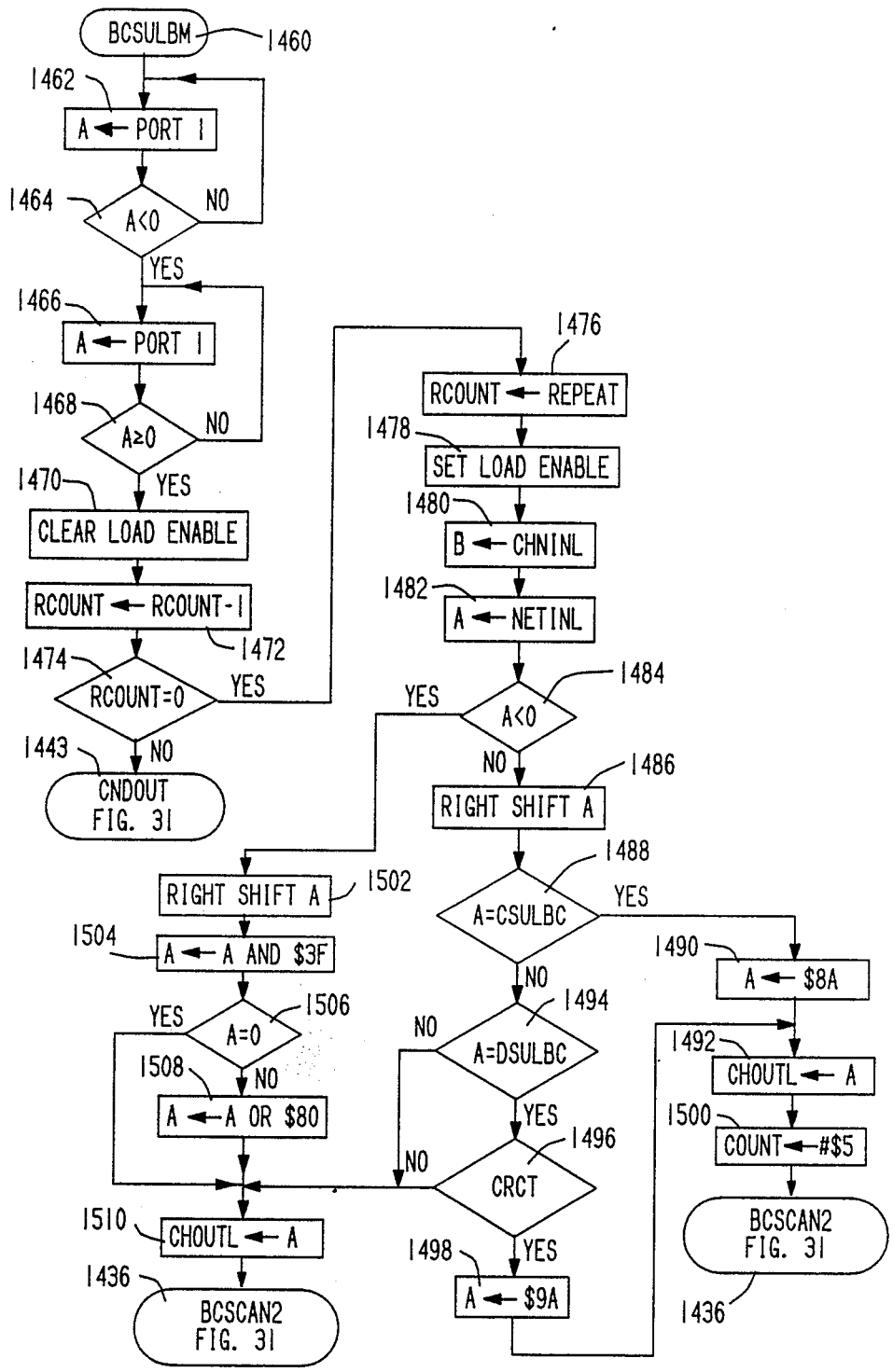
FIG. 32 is a step diagram of a further portion of the program routine of FIG. 31.

In the procedure of FIG. 32, steps 1462, 1464, 1466, 1468, 1470, 1472 and 1474 are similar to the steps 1372, 1374, 1376, 1378, 1380, 1382 and 1384 of FIG. 30 for detecting the leading edge of the next 8K clock pulse, clear the load enable gate, decrementing RCOUNT, and returning to point 1443 of FIG. 31 when RCOUNT is greater than 0 so that last input byte is transferred to the network output register for five, ten or twenty times, depending upon whether the customer data rate is 9.6, 4.8 or 2.4 kb/s. When RCOUNT becomes 0, the program branches from step 1474 to step 1476 where the RCOUNT is restored to five, ten or twenty, depending upon customer rate. In step 1478 the microprocessor 342 enables gate 340 to pass the next 8K clock pulse to line 344 which loads the customer output shift registers and provides a synchronizing signal for the customer and network rate clock circuits. In steps 1480 and 1482 the customer input byte and network input byte are read. If the network input byte is a control code, the program in step 1484 branches to step 1486 where the bits of the code are shifted right one bit and then to step 1488 where the shifted byte is compared to the customer service unit loopback code. If true, a customer service unit loopback data byte is loaded in register A in step 1490 and then transferred to the channel output register 582 in step 1492. If step 1488 is false, the program checks the code for a data service loopback code in step 1494 and if true proceeds to step 1496 where the CRCT option being present results in advancement to step 1498 where a data service unit loopback data byte is loaded into register A prior to proceeding to step 1492. After the data has been written to the customer output register, the program resets the count to five in step 1500 and returns to point 1436 of FIG. 31.

If the network input byte is a data byte, the program from step 1484 in FIG. 32 branches to step 1502 where the data byte is shifted right one bit and then to step 1504 where the two highest bits are made 0 to reformat the network data byte. If the reformatted byte is greater than 0, the eighth bit is made one in step 1508 to indicate a customer output data byte. From step 1508, from step 1506 if the data byte is 0, or from steps 1494 or 1496 if false, the program proceeds to step 1510 where the byte is transferred to the customer output latch 582 prior to returning to point 1436 of FIG. 31. It is noted that the hardware will convert the customer byte into an XOV violation code when bit eight is 0.

The program will continue to cycle through the routine beginning at point 1436 in FIG. 31 and continuing in FIG. 32 so long as the input bytes are customer service unit loopback codes or data service unit loopback codes. Once five network input bytes are received which are neither a customer service unit loopback code nor a data service unit loopback code, the count in step 1440 is found to be equal to 0 and the program branches to point 1414 of FIG. 29 where the loopback mode is terminated and the program returns to the beginning point 1032 of the main program loop of FIG. 27.

At step 1300 in FIG. 27, the program will branch to step 1512 when the channel input byte is a control code. In step 1512 the corresponding network control code is read from Table II such as by steps identical to steps 1358, 1360, 1362, 1364 and 1366 of FIG. 29. In step 1514 the network control code is compared to a data service unit loopback code, and if true, proceeds to step 1516 where the CRTC option is detected. The CRTC option tells if the data service unit loopback mode is available to the customer. If true, the program proceeds to step 1518 where the data service unit loopback data byte is changed to a corresponding network control code for being transmitted in the subsequent step 1304 to the network output latch.

In step 1272 if RCOUNT is not equal to 0, the program branches to point 1520 so that output of the network byte may be repeated for a number of times equal to RCOUNT.

The number of steps in the program, and the code required to proceed through the various routines, is selected so that the program will proceed from point 1030, 1130 or 1210 through a routine to point 1030, 1130 or 1210 when in the 56 kb/s mode, or will proceed from point 1260, 1372 or 1462 when in a subrate mode, in duration less than the duration between leading edges of successive 8K network clock pulses so that no reading of network or customer bytes is missed.

Since many modifications, variations and changes in detail may be made to the above described embodiments without departing from the scope and spirit of the invention, it is intended that all matter in the foregoing description and shown in the accompanying drawings be interpreted as illustrative and not in a limiting sense.

What is claimed is:

1. A receiver circuit for restoring a bipolar customer data signal at a bipolar customer data bit rate equal to or less than 250 kb/s, the circuit comprising customer data input means for receiving serial bipolar input signals from a data transmission line having a length which is between a maximum length producing a maximum permissible signal loss characteristic and a minimum length producing a minimum signal loss characteristic at the customer data frequency;

a PCM integrated circuit repeater designed for use in a circuit restoring 1.544 Mb/s communication signals in transmission lines; said repeater including a repeater amplifier, a peak detector for detecting output signals above a selected magnitude from the repeater amplifier, and voltage responsive resistance means for producing a variable resistance inversely proportional to an output voltage from the peak detector;

equalizer circuit means connected with the repeater amplifier such that the repeater amplifier produces restored bipolar output signals by fixed amplification and frequency spectrum restoration sufficient to restore original signal magnitude and characteristics to input signals having the maximum signal loss characteristics;

buffer amplifier means having its output connected with the input of the repeater amplifier;

means including series resistance means connecting the customer data input means to the input of the buffer amplifier means; and a parallel connected resistance and capacitance being connected in series by a coupling capacitance with the repeater voltage responsive resistance means across the input of the buffer amplifier so that the maximum signal loss characteristics are produced in the output signal of the buffer amplifier means.

2. A receiver circuit as claimed in claim 1 wherein the buffer amplifier means includes first and second buffer amplifiers and a low pass filter circuit connecting the output of the first buffer amplifier to the input of the second buffer amplifier, the input of said first buffer amplifier being the input of said buffer amplifier means, and the output of said second buffer amplifier being the output of said buffer amplifier means.

3. A circuit for restoring and converting a bipolar customer data signal into a pair of binary signals at a bipolar customer data frequency equal to or less than 250 kb/s, the circuit comprising customer data input means for receiving serial bipolar input signals from a data transmission line having a length which is between a maximum length producing a maximum permissible signal loss characteristic and a minimum length producing a minimum signal loss characteristic at the customer data frequency;

a PCM integrated circuit repeater designed for use in a circuit restoring and converting 1.544 Mb/s communication signals in transmission lines; said repeater including a repeater amplifier, a peak detector for detecting output signals above a selected magnitude from the repeater amplifier, and voltage responsive resistance means for producing a variable resistance inversely proportional to an output voltage from the peak detector;

equalizer circuit means connected with the repeater amplifier such that the repeater amplifier produces restored bipolar output signals by fixed amplification and frequency spectrum restoration sufficient to restore original signal magnitude and characteristics to input signals having the maximum signal loss characteristics;

buffer amplifier means having its output connected with the input of the repeater amplifier;

means including series resistance means connecting the customer data input means to the input of the buffer amplifier means;

a parallel connected resistance and capacitance being connected in series by a coupling capacitance with the repeater voltage responsive resistance means across the input of the buffer amplifier so that the maximum signal loss characteristics are produced in the output signal of the buffer amplifier circuit; and means for converting the restored bipolar output signals from the repeater amplifier into a pair of binary signals corresponding to the respective positive and negative signals in the bipolar input signals.

4. A circuit as claimed in claim 3 wherein the converting means includes full wave rectifier means for producing a rectified binary pulse signal from the restored bipolar output signals;

reference signal means for receiving a reference signal having a frequency which is an integer multiple greater than four times the customer data frequency, a divider for dividing the reference signal to produce a clock pulse signal at the customer data frequency;

gate means connected between reference signal means and the divider and being normally enabled to pass the reference signal to the divider;

an exclusive OR gate having inputs connected to the respective outputs of the full wave rectifier and the divider;

an integrator connected to the output of the exclusive OR gate for producing an output voltage which varies with the relative phase of the rectified binary pulse signal and the clock signal;

first voltage comparator means having an input connected to the output of the integrator and having its output connected to the gate means for disabling the gate means for one cycle of the reference signal when the integrator output voltage indicates that the leading edge of the pulses in the clock signal lead the center of the pulses in the rectified signal by more than a predetermined phase angle;

normally disabled frequency doubler means connected in parallel with the gate means;

second voltage comparator means having an input connected to the output of the inegrator and having its output connected to the gate means and the frequency doubler means for disabling the gate means and enabling the frequency doubler means for one cycle of the reference signal when the integrator output voltage indicates that the leading edges of the pulses in the clock signal trail the center of the pulses in the rectified signal by more than a predetermined phase angle;

a positive pulse threshold detector connected to the output of the repeater amplifier for producing first binary pulses coinciding with positive pulses in the restored bipolar output signal;

a negative pulse threshold detector connected to the output of the repeater amplifier for producing second binary pulses coinciding with negative pulses in the restored bipolar output signal; and a pair of flip-flops having clock inputs connected to the output of the divider and having respective data inputs connected to the outputs of the respective threshold detectors for producing the pair of binary signals corresponding to the respective positive and negative pulses in the bipolar input signals.

5. A circuit as claimed in claim 4 including means for detecting when trailing edges of pulses in the clock signal coincide with the pulses in the rectified signal, said detecting means including means for disabling the gate means and for enabling the frequency doubler means while trailing edges of pulses in the clock signal coincide with the pulses in the rectified signal to prevent improper clock synchronization.

6. A circuit for converting bipolar data signals into a pair of binary signals, comprising full wave rectifier means for producing a rectified binary pulse signal from the bipolar signals;

reference signal means for receiving a reference signal having a frequency which is an integer multiple greater than four times a customer data frequency;

a divider for dividing the reference signal to produce a clock pulse signal at the customer data frequency;

gate means connected between reference signal means and the divider and being normally enabled to pass the reference signal to the divider;

an exclusive OR gate having inputs connected to the respective outputs of the full wave rectifier and the divider;

an integrator connected to the output of the exclusive OR gate for producing an output voltage which varies with the relative phase of the rectified binary pulse signal and the clock pulse signal;

first voltage comparator means having an input connected to the output of the integrator and having its output connectd to the gate means for disabling the gate means for one cycle of the reference signal when the integrator output voltage indicates that the leading edge of the pulses in the clock signal lead the center of the pulses in the rectified signal by more than a predetermined phase angle;

normally disabled frequency doubler means connected in parallel with the gate means;

second voltage comparator means having an input connected to the output of the integrator and having its output connected to the gate means and the frequency doubler means for disabling the gate means and enabling the frequency doubler means for one cycle of the reference signal when the integrator output voltage indicates that the leading edges of the pulses in the clock signal trail the center of the pulses in the rectified signal by more than a predetermined phase angle;

a positive pulse threshold detector receiving the bipolar signals for producing first binary pulses coinciding with positive pulses in the bipolar signals;

a negative pulse threshold detector receiving the bipolar signals for producing second binary pulses coinciding with negative pulses in the bipolar signals; and a pair of flip-flops having clock inputs connected to the output of the divider and having respective data inputs connected to the outputs of the respective threshold detectors for producing the pair of binary signals corresponding to the respective positive and negative pulses in the bipolar input signals.

7. A circuit as claimed in claim 6 including means for detecting when trailing edges of pulses in the clock signal coincide with the pulses in the rectified signal, said detecting means including means for disabling the gate means and for enabling the frequency doubler means while trailing edges of pulses in the clock signal coincide with the pulses in the rectified signal to prevent improper clock synchronization.

* * * * *